(12) United States Patent
Hutton et al.

(10) Patent No.: US 6,669,406 B2
(45) Date of Patent: Dec. 30, 2003

(54) METHOD AND APPARATUS FOR UNDERGROUND CONNECTION OF PIPE

(75) Inventors: William M. Hutton, Nazareth, PA (US); Frank P. Russo, Swiftwater, PA (US); John K. Gilday, Staten Island, NY (US); Michael G. Palmer, Easton, PA (US)

(73) Assignee: Omega Tools, Inc., Portland, PA (US)

( * ) Notice: Subject to any disclaimer, the term of this patent is extended or adjusted under 35 U.S.C. 154(b) by 0 days.

(21) Appl. No.: 10/008,814

(22) Filed: Nov. 13, 2001

(65) Prior Publication Data

US 2002/0122704 A1 Sep. 5, 2002

Related U.S. Application Data

(63) Continuation-in-part of application No. 09/855,222, filed on May 15, 2001.
(60) Provisional application No. 60/204,289, filed on May 15, 2000.

(51) Int. Cl.$^7$ ................................................. F16L 55/18
(52) U.S. Cl. ........................ 405/184.1; 405/184.3; 405/154.1; 285/197; 138/97; 138/99
(58) Field of Search ......................... 405/154.1, 158, 405/169, 170, 184.1, 184.3, 184.5; 285/21.1, 23, 197–199; 138/97–99, 140–143

(56) References Cited

U.S. PATENT DOCUMENTS

| 4,091,514 | A | * | 5/1978 | Motes-Conners et al. ... 405/170 |
| 4,647,073 | A | * | 3/1987 | Kosaka ......................... 285/23 |
| 4,934,109 | A | * | 6/1990 | Allred .......................... 451/51 |
| 5,364,207 | A | * | 11/1994 | Reber et al. ............. 405/184.5 |
| 5,430,921 | A | * | 7/1995 | McGuire ..................... 138/140 |
| 5,462,077 | A | * | 10/1995 | Cohen et al. ............ 405/184.1 |
| 5,613,807 | A | * | 3/1997 | Reber et al. ............. 405/184.1 |
| 5,624,206 | A | * | 4/1997 | Cohen et al. ............ 405/184.1 |
| 5,913,335 | A | * | 6/1999 | Lyall ........................... 138/97 |
| 5,988,689 | A | * | 11/1999 | Lever ......................... 285/21.1 |
| 6,267,037 | B1 | * | 7/2001 | McCoy, Jr. et al. ........... 83/745 |

FOREIGN PATENT DOCUMENTS

| GB | 2038973 | * | 7/1980 | ................. 405/169 |
| JP | 2002013693 | * | 1/2002 | |

* cited by examiner

*Primary Examiner*—Jong-Suk (James) Lee
(74) *Attorney, Agent, or Firm*—Paul & Paul

(57) ABSTRACT

The method and two devices provide for the underground connection of pipe with minimal disruption of the surrounding landscape. A main pipe is cleaned by a surface preparation tool designed to access the main pipe through a small hole. An adaptor is attached to a second pipe, and then placed in a clamping device designed to access the main pipe and clamp the adaptor thereto through the small hole. Electricity is passed through the adaptor, thereby softening the plastic so that this softening and the pressure of the clamp secures the adaptor to the main pipe. The main pipe is then pierced by the adaptor's tapping tee.

29 Claims, 22 Drawing Sheets

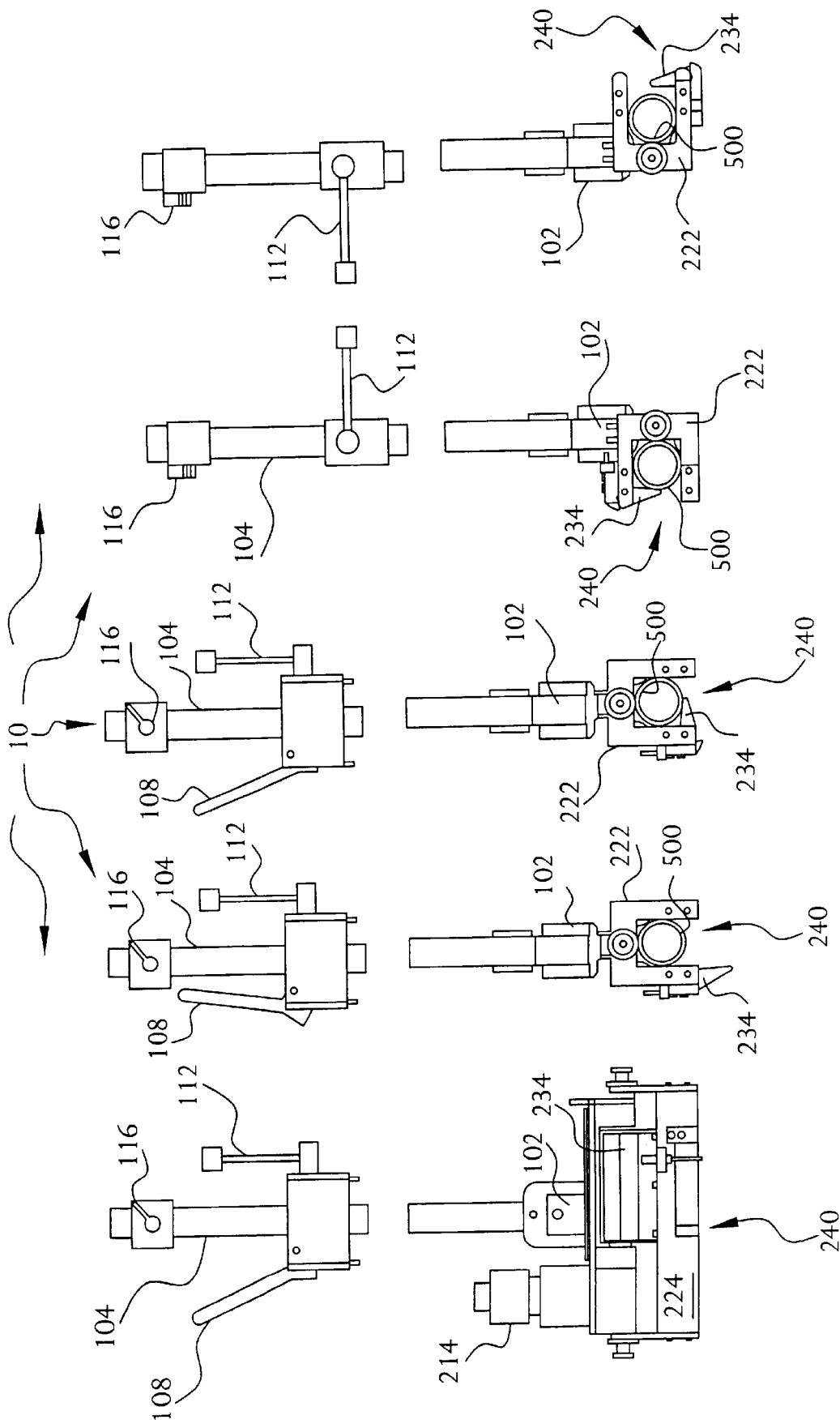

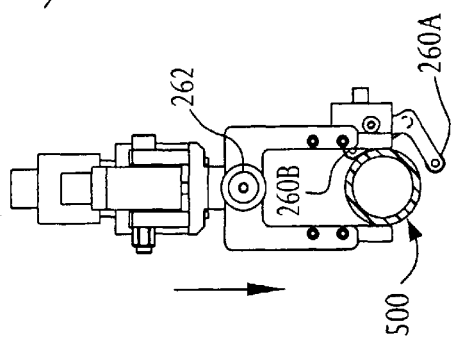
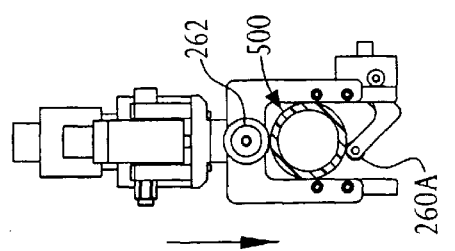
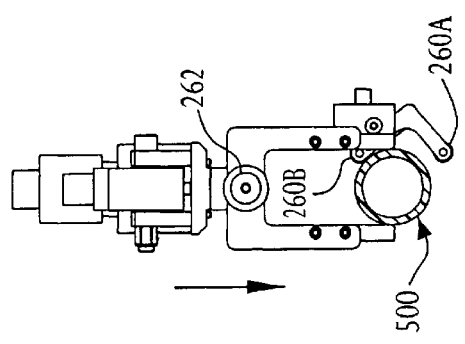
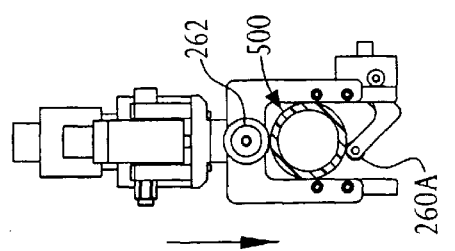
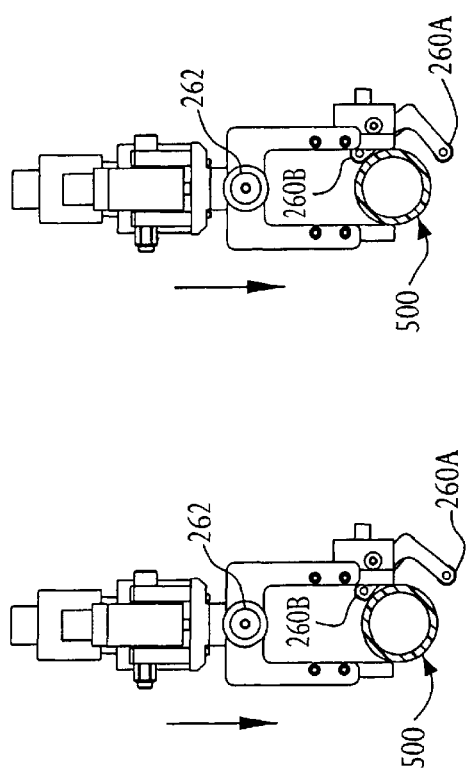
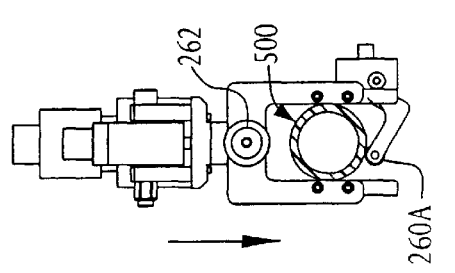
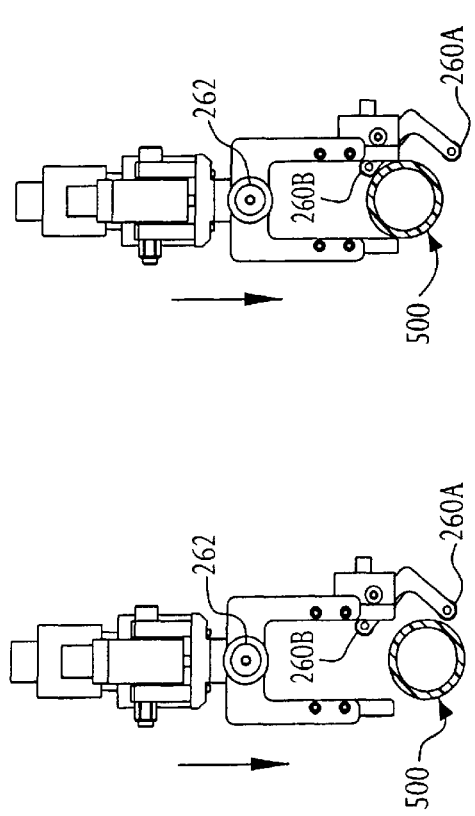
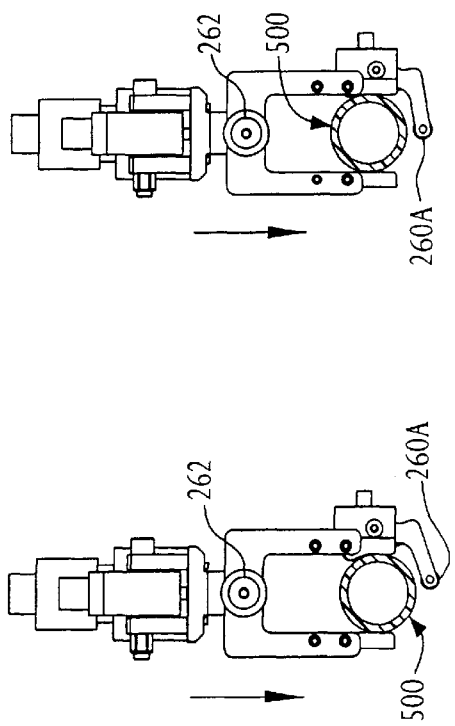

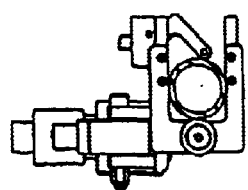
FIG. 13A START POSITION
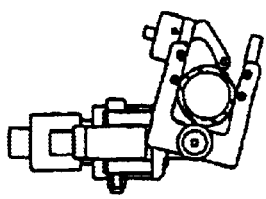
FIG. 13B
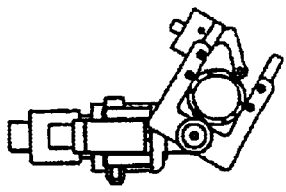
FIG. 13C
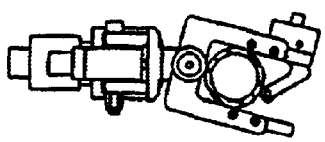
FIG. 13G TOOL PLACEMENT ONTO PIPE
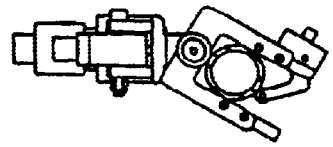
FIG. 13H
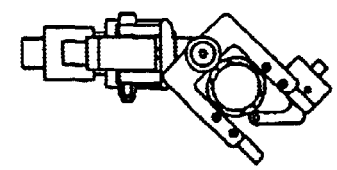
FIG. 13I
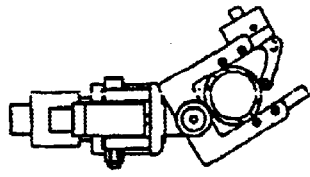
FIG. 13D
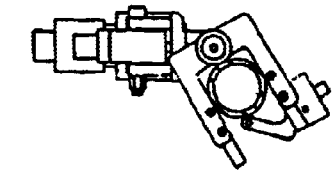
FIG. 13J
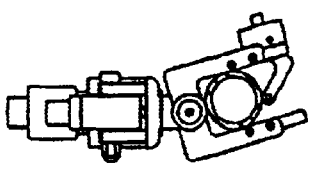
FIG. 13E
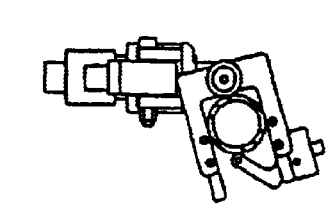
FIG. 13K
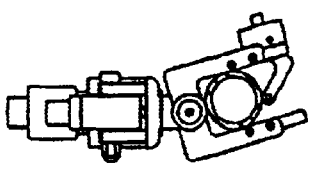
FIG. 13F
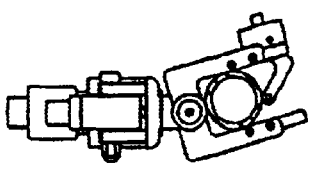
FIG. 13L
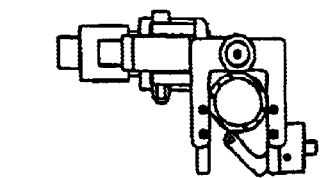
FIG. 13M FINISH POSITION

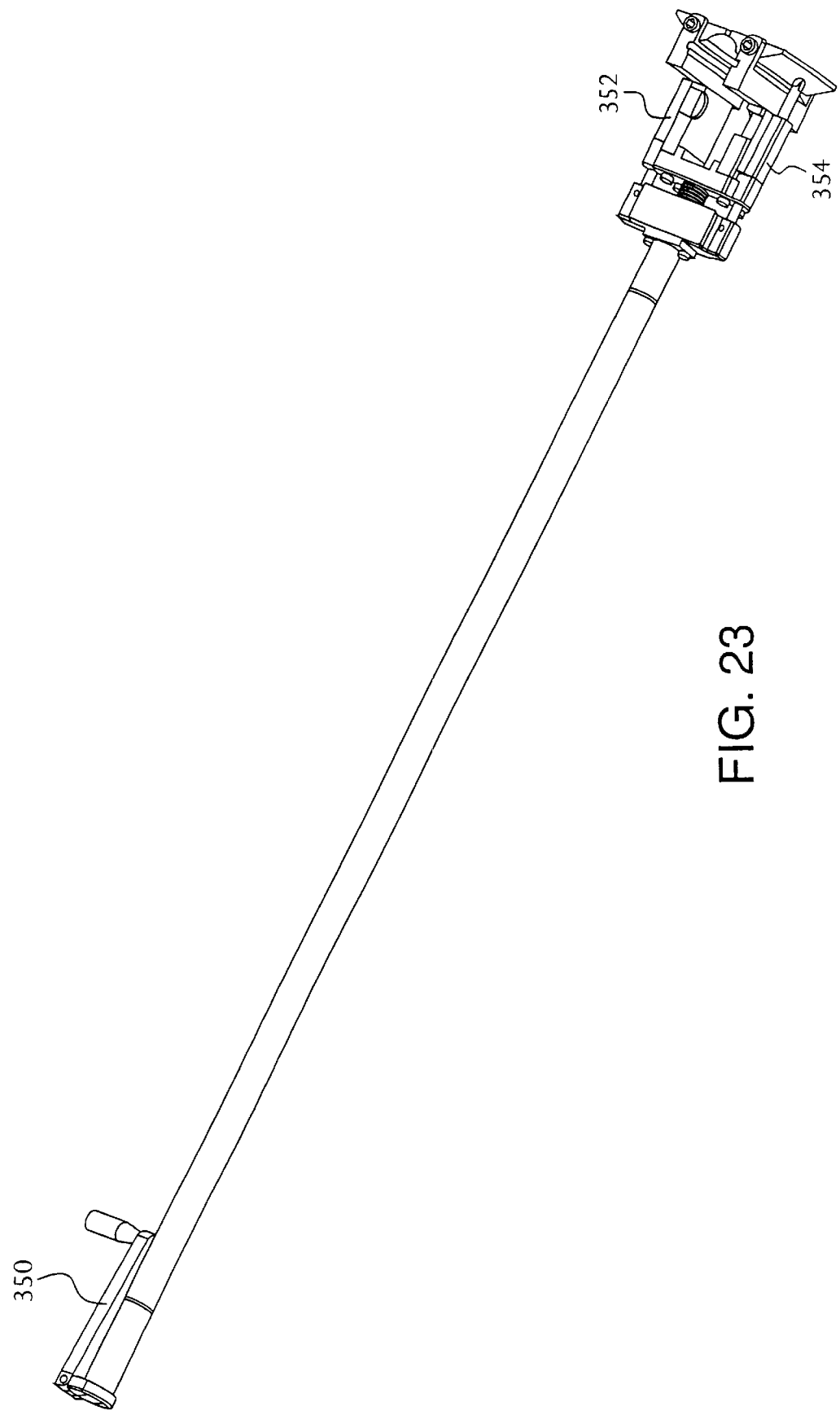

METHOD AND APPARATUS FOR UNDERGROUND CONNECTION OF PIPE

CROSS-REFERNCE TO RELATED APPLICATIONS

This is a continuation-in-part application of U.S. application Ser. No. 09/855,222 filed May 15, 2001, which claims the benefit of priority to U.S. Provisional Application No. 60/204,289 filed May 15, 2000.

BACKGROUND OF THE INVENTION

1. Field of the Invention

The invention is a method and apparatus for connecting underground pipe while minimizing disturbance to the surrounding landscape.

2. Description of the Related Art

Currently, the process of joining underground pipes requires significant excavation of the ground around the joint, thereby causing considerable disruption to the surrounding landscape, and limiting the location of underground pipes with respect to buildings. A method of joining pipes underground by using only a small hole, as is provided by the present invention, minimizes these difficulties.

U.S. Pat. No. 5,791,073, issued to M. G. Palmer and R. M. Saroney on Aug. 11, 1998, describes a vacuum excavation system which may be used to provide the holes in the ground through which the apparatus and method of the present invention may connect pipes. No pipe connection system is disclosed within this patent.

SUMMARY OF THE INVENTION

The invention is an apparatus and method for joining underground pipes while causing as little disturbance as possible to the surrounding landscape.

The process begins by using a vacuum excavator (well-known) to produce a vertical hole large enough for the boring head of a directional drilling machine (also well-known), and to provide space for an electrofusion tee (described below). Next, a hole is drilled towards the main at an acute angle from horizontal, with 15° being preferred, using the directional drilling machine, until the depth of the pipe is reached. The boring head is then angled horizontal for the remainder of its travel to the main pipe. The boring head stops within the hole made by the vacuum excavator, directly above the main pipe.

Once the boring head has reached the vacuum-excavated hole, an appropriate length of pipe is attached to a Chinese Finger (well-known) on the boring head, and the boring head is retracted through the hole, pulling the pipe with it.

Next, the main pipe must be prepared for bonding. The main pipe will typically include a layer of polyethylene oxide approximately 0.002 inch to 0.004 inch thick, which must be removed. The surface preparation tool described herein performs this oxide removal by milling the oxide from the top half of the main pipe. The pipe must then be kept free of foreign contamination. Cleaning the main pipe with denatured alcohol will serve this purpose.

The adaptor is then attached to the end of the pipe protruding from the ground. The adapter is clamped into an electrofusion valve-clamping tool. Electrical wires are secured to each of the two contacts in the adaptor. The clamping tool is then lowered around the main pipe, thereby positioning the adaptor on top of the main pipe. The clamping tool clamps around the bottom of the pipe to pull the adaptor against the pipe. Electrical current passing through the adaptor softens the plastic. The combination of softening the plastic and pressure seals the adaptor to the main pipe. After testing the connection by pressure testing, the main pipe can be pierced using a tapping tee contained within the adaptor. Gas can now flow between the main pipe and the new pipe.

It is therefore an object of the present invention to provide a method for connecting underground pipes while minimizing disturbance of the surrounding soil.

It is another object of the present invention to provide a method for connecting underground pipes whereby the entire process is completed through two holes in the ground.

It is a third object of the present invention to provide a method of connecting underground pipes that is simpler and less costly than previous methods.

It is a fourth object of the present invention to provide a method of connecting underground pipes that permits the pipe to be located closer to buildings than previous methods will permit.

It is a fifth object of the present invention to provide a surface preparation tool for underground connection of pipes capable of preparing the surface of an underground pipe through a small diameter hole.

It is a sixth object of the present invention to provide a surface preparation tool for underground connection of pipes having a milling cutter for removing an oxide layer from a pipe.

It is a seventh object of the present invention to provide a surface preparation tool capable of accessing the top 180° of an underground pipe through a small hole.

It is an eighth object of the present invention to provide an electrofusion valve clamping tool capable of securing an adaptor to an underground pipe through a small diameter hole in the ground.

It is a ninth object of the present invention to provide an electrofusion valve clamping tool having clamping ears for pulling the adaptor against the pipe.

These and other objects of the invention will become apparent through the following description and claims.

BRIEF DESCRIPTION OF THE DRAWINGS

FIG. 3 is a side view of a surface preparation tool according to the present invention, showing the tool in its clamped configuration.

FIG. 4 is a front environmental view of a surface preparation tool according to the present invention, showing the upper portion of the handle rotated 90° for clarity, and the tool placed over the top of a pipe.

FIG. 5 is a front environmental view of a surface preparation tool according to the present invention, showing the upper portion of the handle rotated 90° for clarity, and the tool clamped to a pipe.

FIG. 6 is a front environmental view of a surface preparation tool according to the present invention, showing the tool rotated to one side of a pipe.

FIG. 7 is a front environmental view of a surface preparation tool according to the present invention, showing the tool rotated to the opposite side of a pipe.

FIGS. 12A–12H are front views of the milling assembly of the surface preparation tool according to the present invention illustrating the alternate clamping arm being attached to a pipe.

FIGS. 13A–13M are front views of the milling assembly of the surface preparation tool according to the present invention illustrating the alternate clamping arm attached to a pipe being rotated 90 degrees from center in either direction.

FIG. 23 is a perspective view of the clamping tool of the present invention illustrating the alternate handle and main body extensions.

Like reference numbers denote like elements throughout the drawings.

DETAILED DESCRIPTION OF THE PREFERRED EMBODIMENTS

The invention is a process for connecting underground pipes with minimal disruption of the surrounding landscape. The invention includes a surface preparation tool and an electrofusion valve-clamping tool.

Figure 1:
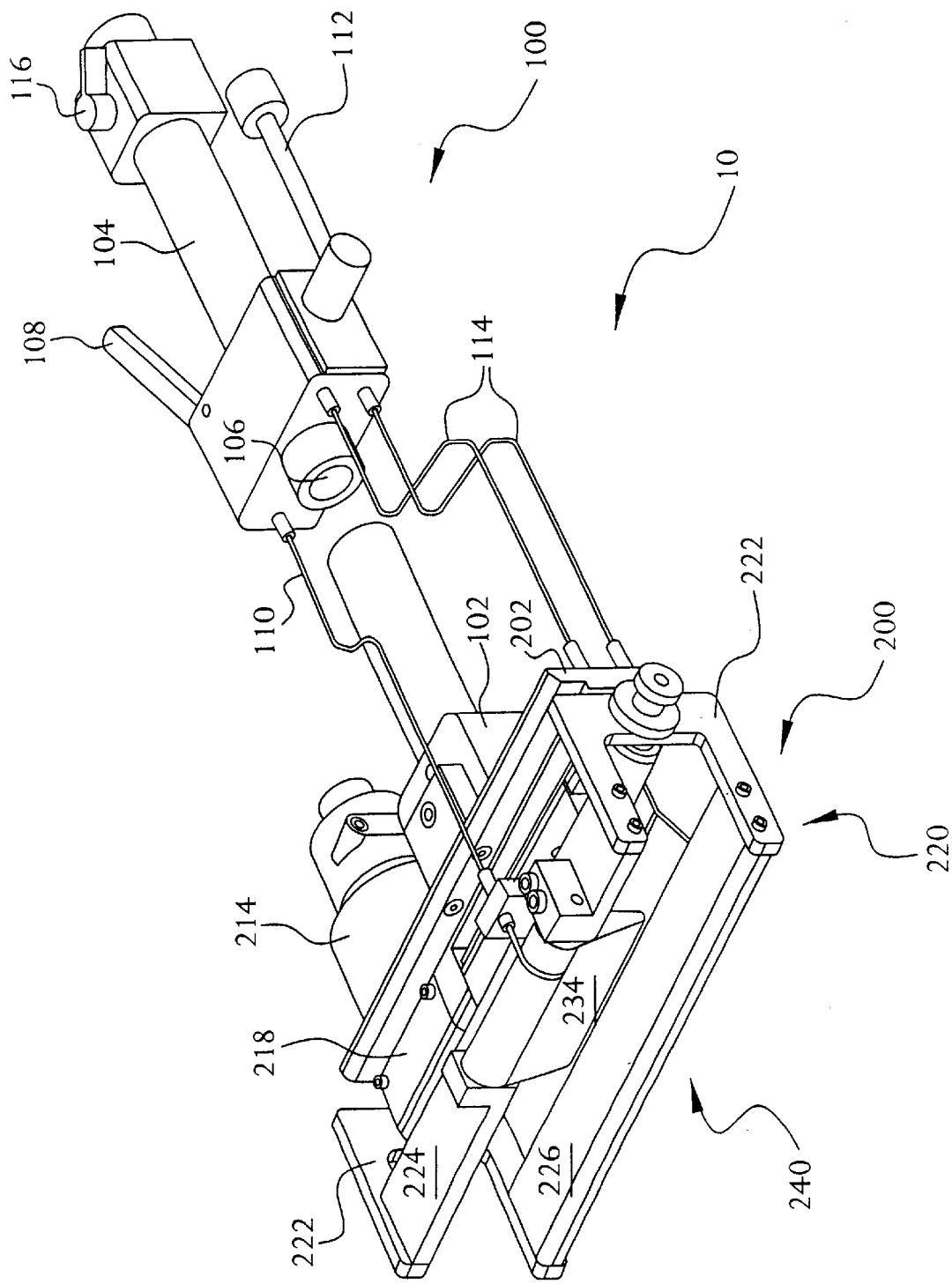
FIG. 1 is a perspective view of a surface preparation tool according to the present invention.
Figure 2A:
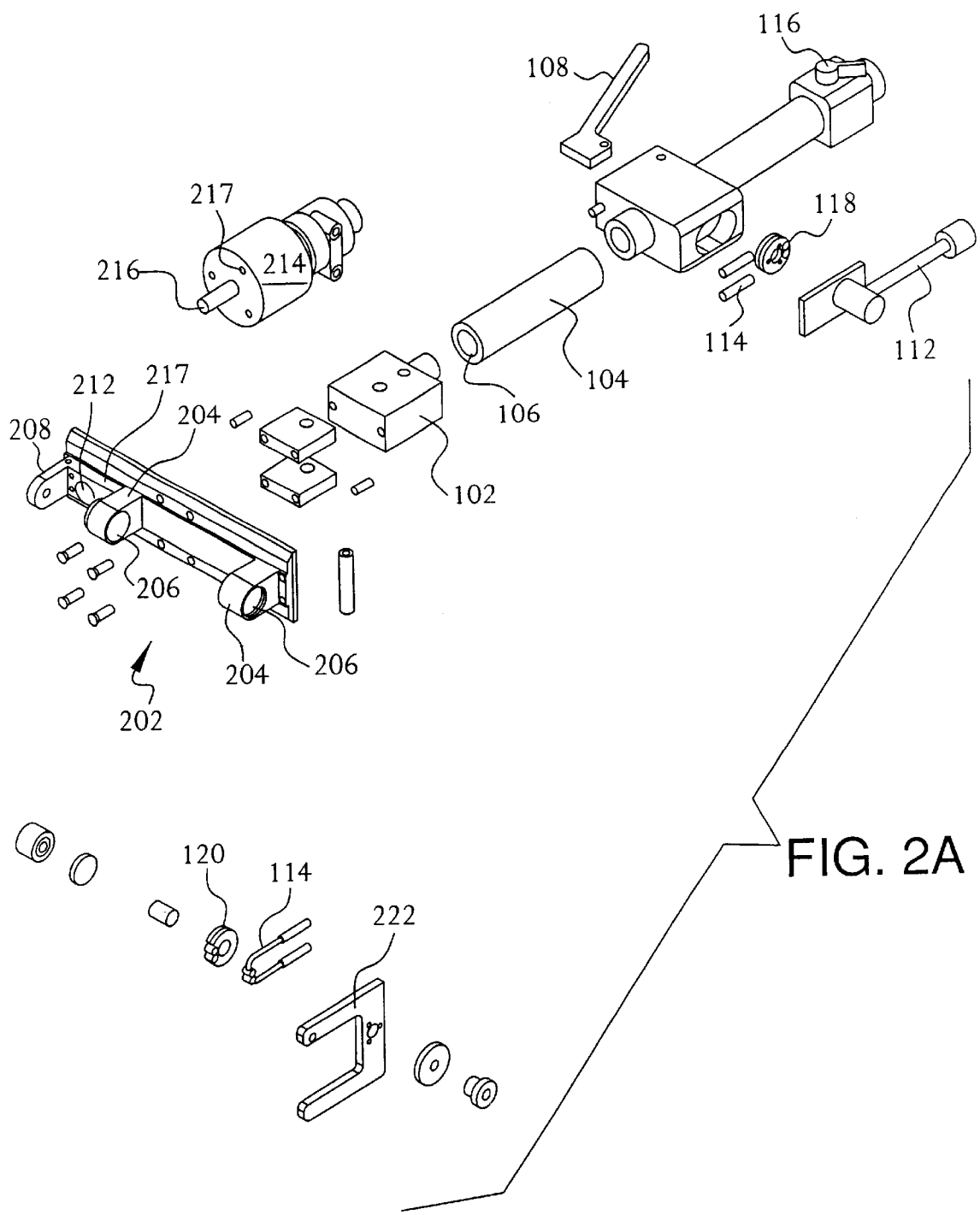
FIG. 2A is an exploded perspective view of the handle portion and part of the milling assembly portion of a surface preparation tool according to the present invention.
Figure 2B:
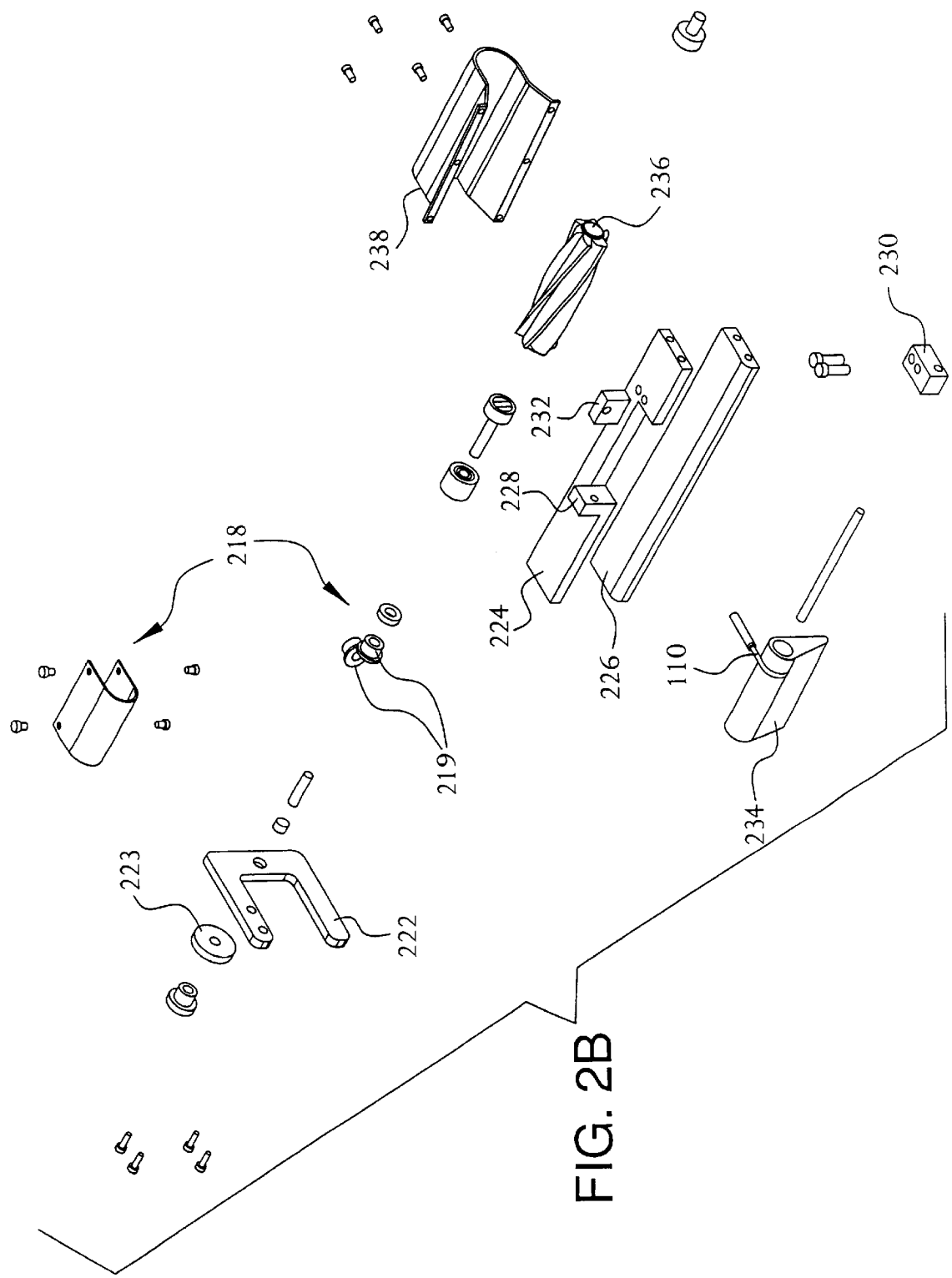
FIG. 2B is an exploded perspective view of the remaining portion of the milling assembly for a surface preparation tool according to the present invention.
Figure 8:
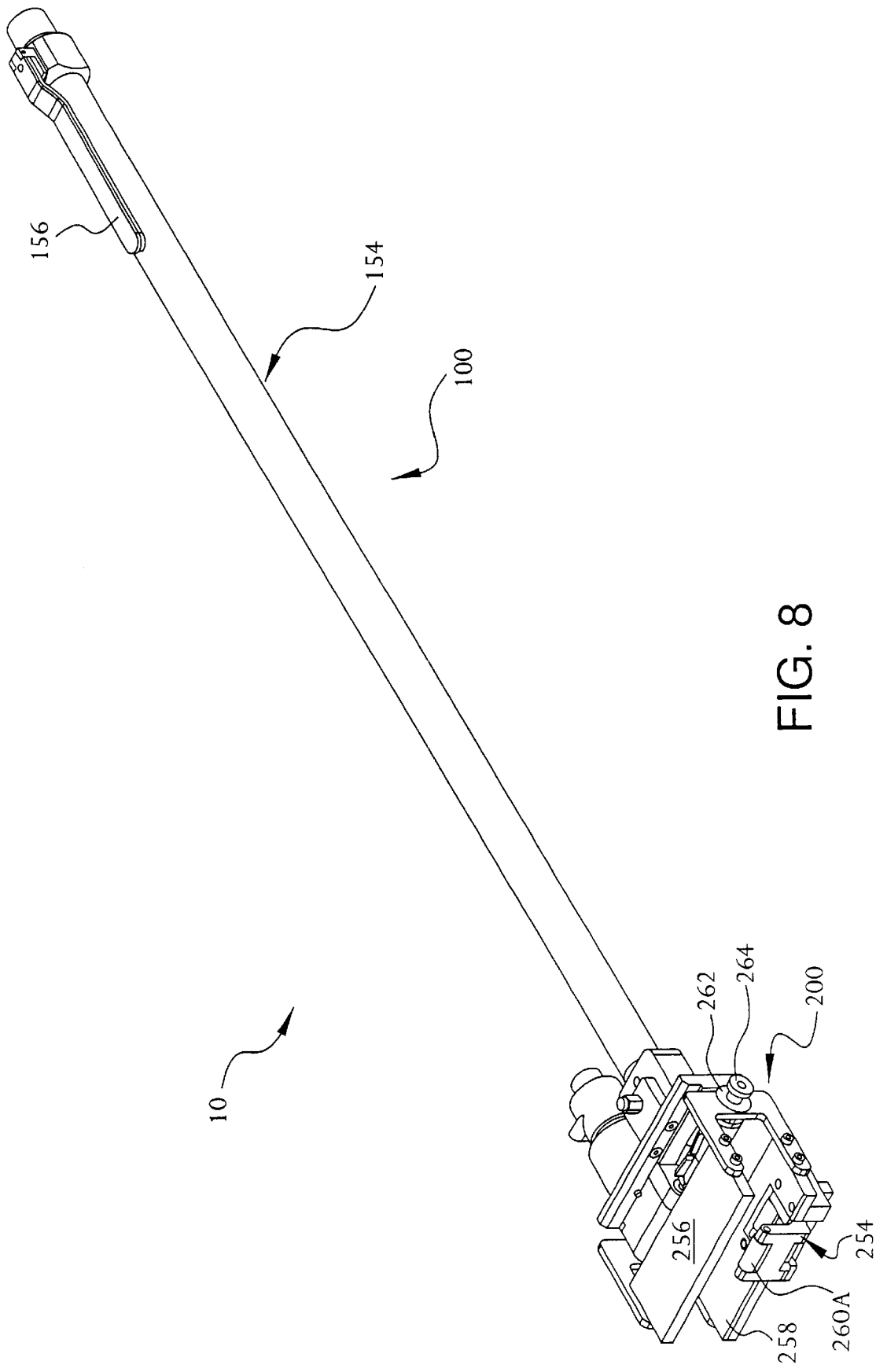
FIG. 8 is a perspective view of the surface preparation tool according to the present invention illustrating the alternate handle and clamping arm.
Figure 9:
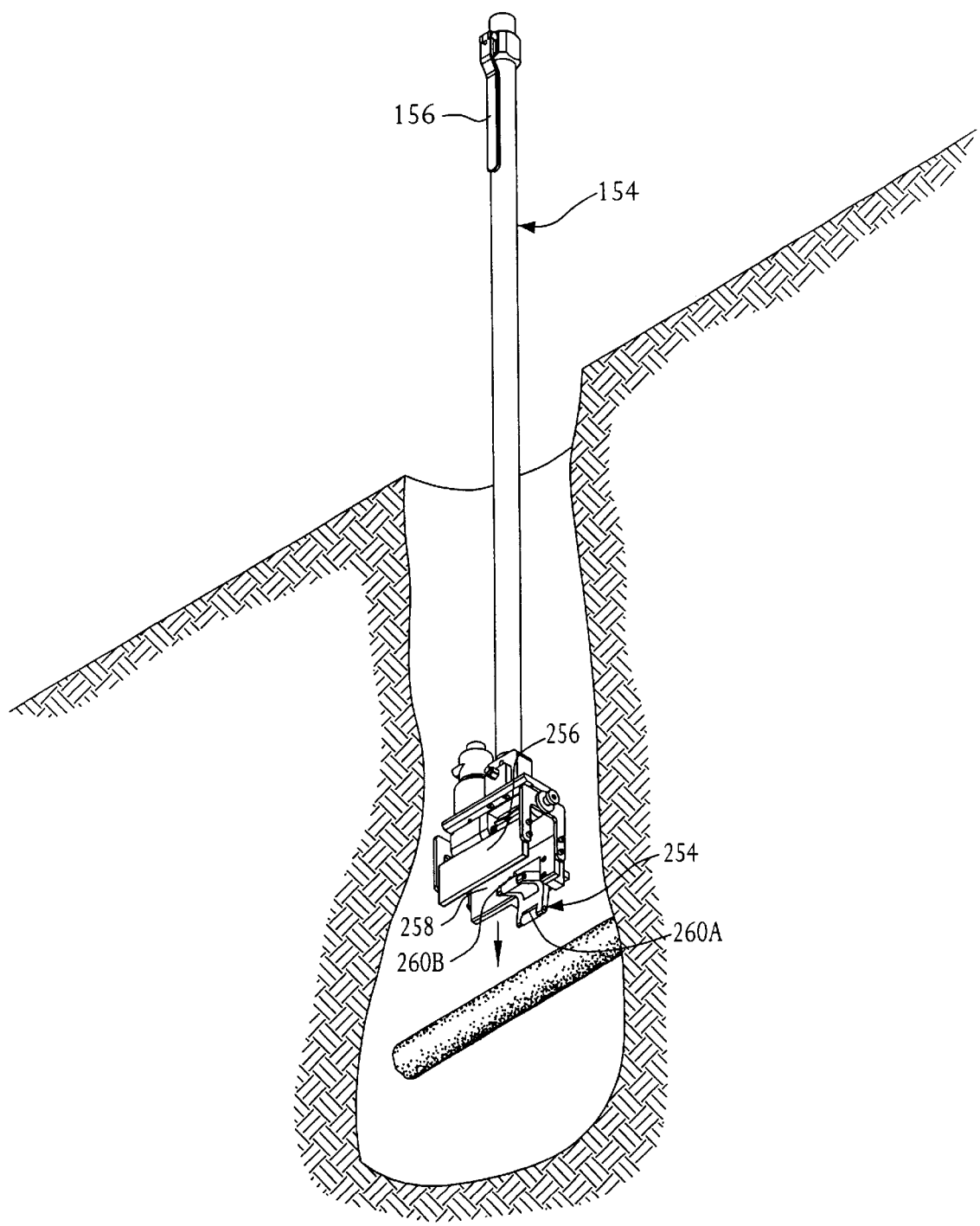
FIG. 9 is an environmental view of the surface preparation according to the present invention illustrating the alternate handle and clamping arm being lowered to an exposed corroded pipe in an excavated access hole.

The surface preparation tool is illustrated in FIGS. 1–7. Referring to FIGS. 1–2, the surface preparation tool 10 includes a handle portion 100 and a milling assembly 200, pivotally secured to the handle portion 100.

The milling assembly 200 includes a base plate 202. The base plate 202 includes means for rotatably securing a milling cutter, means for securing a motor, and preferably includes means for securing a gearbox. The means for rotatably securing a milling cutter are a pair of flanges 204 protruding from the front of the base plate, with each flange defining an aperture 206. A third flange 208 protrudes from the front of base plate 202, defining a third aperture 210 coaxial with the apertures 206, forming the means for securing a gearbox. An aperture 212 within the base plate is located between one flange 204 and the flange 208, providing the means for securing a motor.

A motor 214 is secured to the rear of the base plate 202, with its drive shaft 216 protruding through the aperture 212. The motor 214 may be attached to the base plate 202 by any conventional means, and the motor 214 and base plate 202 preferably include mounting holes 217 for receiving screws for this purpose. The motor 214 may be of any conventional type, with an air motor being preferred. The drive shaft 216 is operatively connected to the gears 219 within the gearbox 218, secured to the base plate 202 opposite the motor.

A pipe guide assembly 220 is secured to the base plate 202. The pipe guide assembly includes a pair of U-shaped end plates 222 at each end of the base plate 202, a first side plate 224 extending from the tip of one end plate 222 to the corresponding tip of the other end plate 222, and a second side plate 226 extending from the opposite tip of one end plate 222 to the corresponding tip of the other end plate 222. The first side plate 224 includes means for pivotally securing a clamp, preferably including a clamp-securing flange 228, a clamp mount 230, and a cable guide 232. A clamp 234 is pivotally secured to the first side plate 224.

A milling cutter 236 is rotatably secured between the flanges 204, and is operatively connected to the gearbox 218. The milling cutter is preferably a helical milling cutter. The milling cutter is preferably surrounded on three sides by a cutter shield 238, exposing only the cutter only at the open end 240 of the milling assembly.

The base plate 202 is connected to the handle portion 100 by a spring-centered handle pivot 102, at one end of the handle 104. The handle 104 is a shaft, preferably hollow, extending upward from the milling assembly 200 and including controls for the clamp 234, the rotation of the milling assembly 200, and the motor 214. The handle 104 also includes a conduit for power for the motor, preferably in the form of a compressed air passage. The air conduit may be formed by a hollow interior 106 of the handle 104, operatively connected to the air motor 214. An air control valve 116 is located along the conduit to control the flow of pressurized air to the motor 214.

The handle 104 includes a means for clamping and unclamping the clamp 234. Preferred and suggested means include a clamp lever 108, and a push-pull cable 110 extending from the clamp lever 108, down the length of the handle, through the cable guide 232, to the clamp 234. Pulling the lever 108 outward pushes the cable 110, pushing the clamp into its closed position, illustrated in FIGS. 3 and 5. Pushing the lever 108 inward pulls the clamp 234 into its open position, illustrated in FIG. 4.

The handle 104 also includes a rotation control lever 112 for the milling assembly. The rotation control lever is secured to a pulley 118 engaging the cable 114. The cable 114 is a continuous loop, secured at its opposite end to a second pulley 120 secured within the milling assembly 200. When the rotation control lever 112 is substantially parallel with the handle 104, the open portion 240 of the milling assembly 200 is directly ahead of the handle, positioned so that if the surface preparation tool 10 is inserted into a hole, the cutter 236 will be positioned to mill the top portion of an underground pipe, illustrated in FIG. 5. When the lever 112 is pulled 90° in one direction, the milling assembly 200 is pulled by cable 114 to a corresponding 90° offset position, to mill one side of a pipe, illustrated in FIG. 6. Pulling the lever 112 in the opposite direction by 900 causes the cable to pull the milling assembly 90° in the opposite direction for milling the opposite side of a pipe, illustrated in FIG. 7. Any portion of the top 180° of a pipe may therefore be milled by positioning the lever 112 in the position corresponding to the desired position of the milling assembly 200.

Referring to FIGS. 8–13M, the alternative hollow handle 154 and clamp 254 for use with the surface preparation tool 10 of the present invention is illustrated. When the lever 156 located on the upper portion of the main handle 154 is activated, the valve (not shown) is shuttled into the open position allowing air to flow through the main handle 154 assembly. The air is then supplied to the air motor 214 by an air tube and pneumatic fittings (not shown).

An alternate clamp 254 and modified side plates 256, 258 are best illustrated in FIGS. 8–11. While the first side plate 256 is continuous and flat, the second side plate 258 includes the alternate clamp 254. The clamp arm 254 is rotatably attached to the second side plate 258, thereby allowing movement of the clamp arm 254 to engaged and disengage the pipe 500. The L-shaped clamp arm 254 has a clamp roller 260A, 260B attached at both ends which assist and guide the engagement and disengagement of the pipe (as described below).

Figure 10:
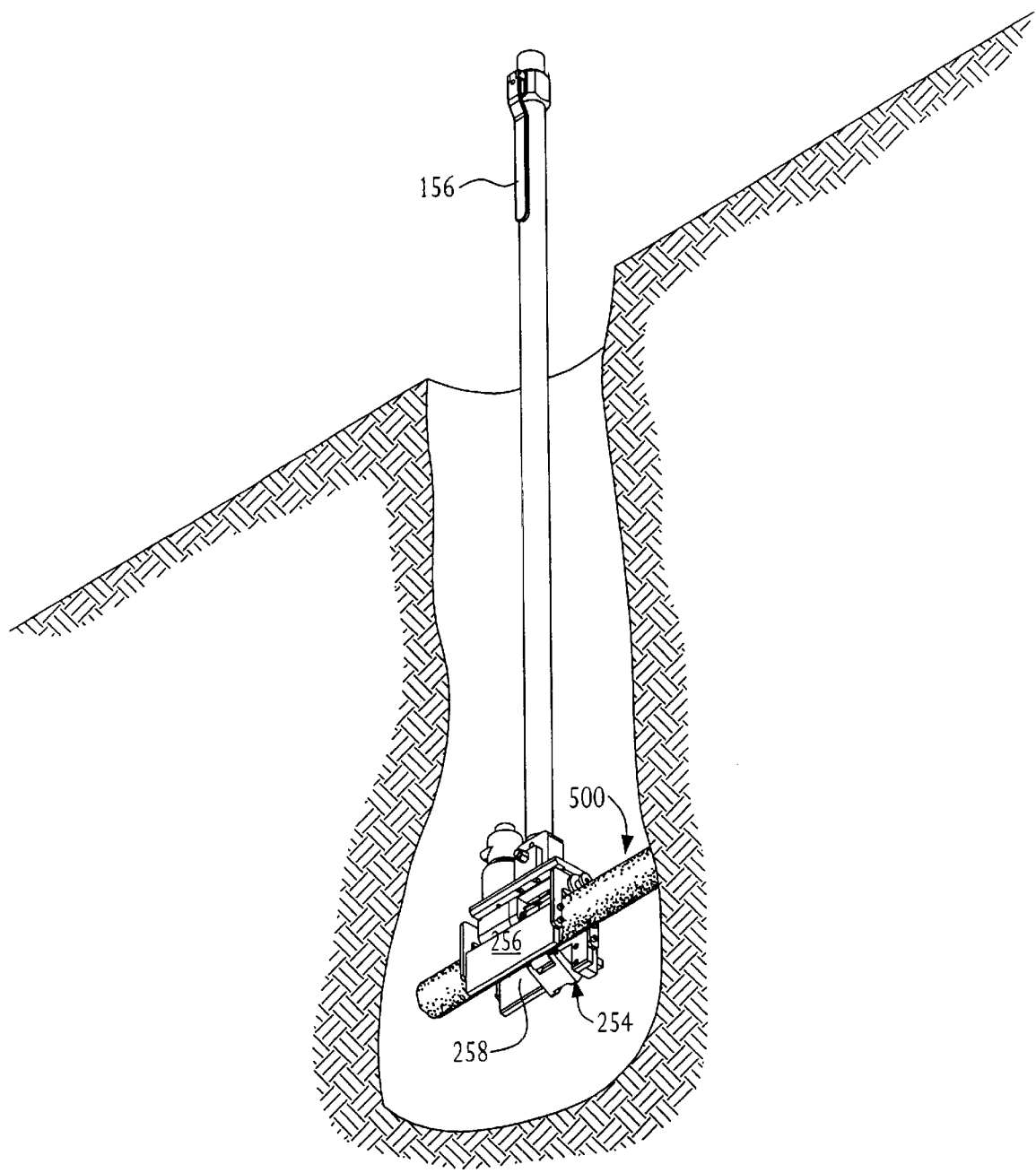
FIG. 10 is a perspective environmental view of the surface preparation tool according to the present invention illustrating the alternate handle and clamping arm attached to an exposed corroded pipe in an excavated access hole.
Figure 10A:
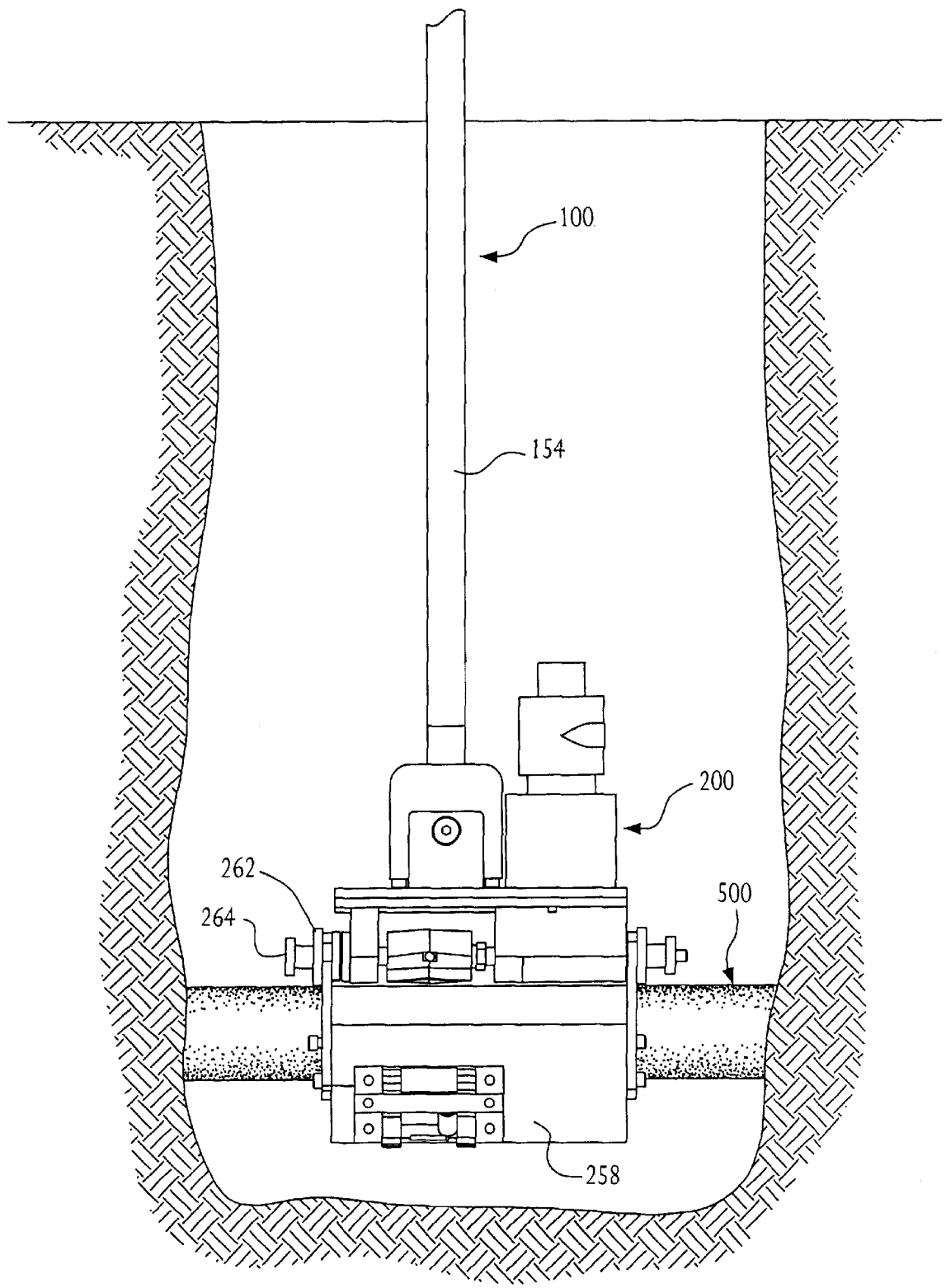
FIG. 10A is a side environmental view of the surface preparation tool according to the present invention illustrating the alternate clamping arm attached to an exposed corroded pipe and excavated access hole.
Figure 11:
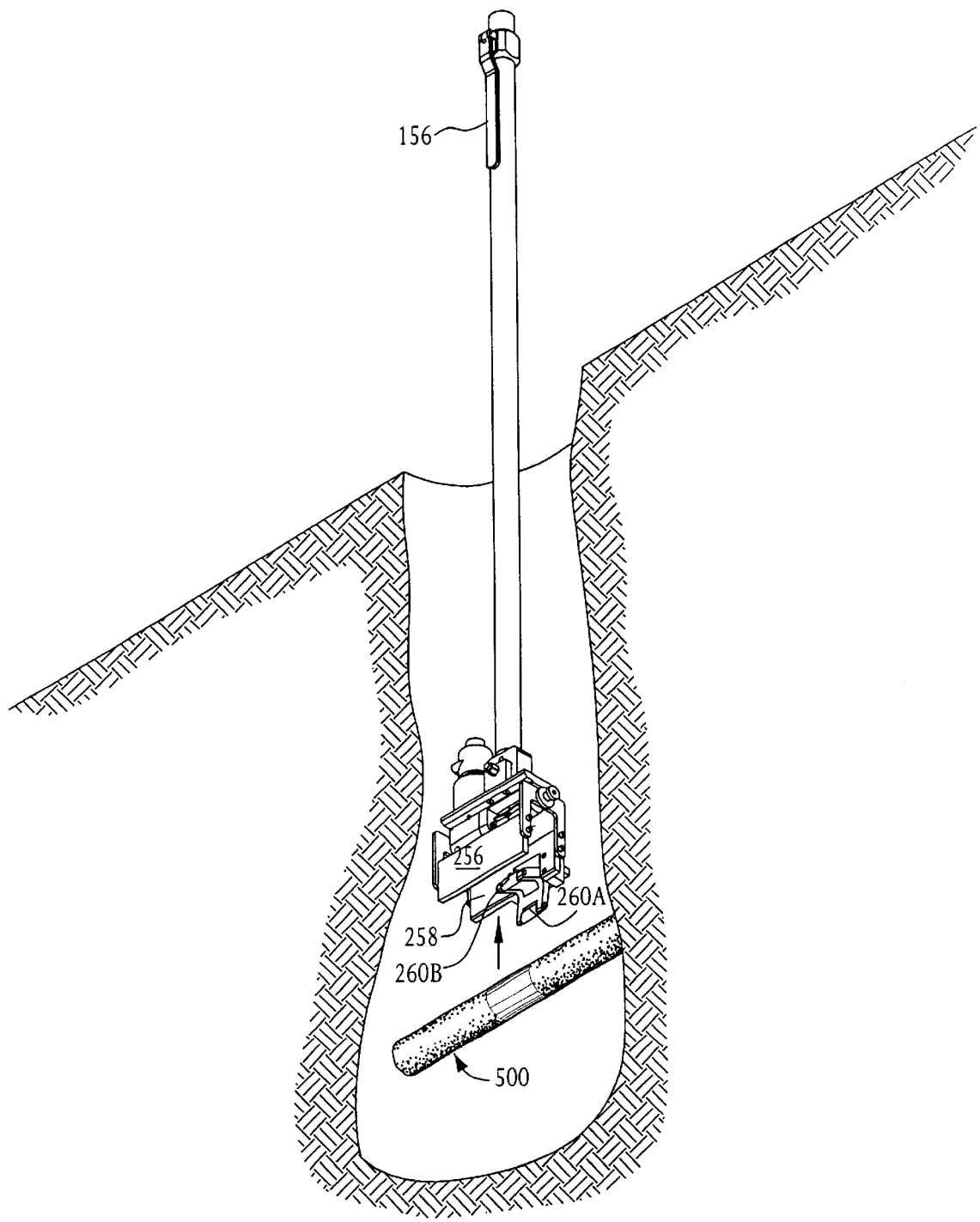
FIG. 11 is a perspective environmental view of the surface preparation tool according to the present invention illustrating the alternate handle and clamping arm being removed from an exposed prepared pipe and excavated access hole.
Figure 16:
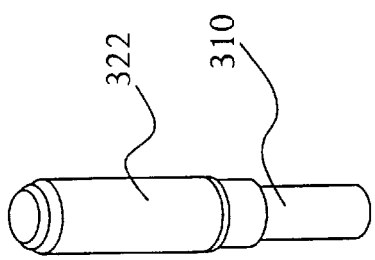
FIG. 16 is a perspective view of a handle assembly of an electrofusion valve-clamping tool according to the present invention.
Figure 15:
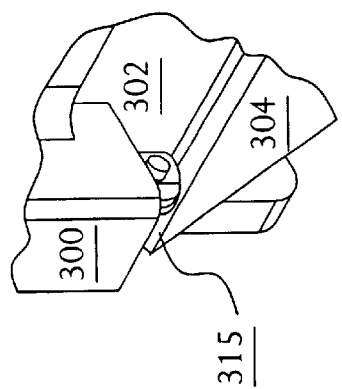
FIG. 15 is a perspective view of the bottom rear portion of an electrofusion valve clamping tool according to the present invention, illustrating the interaction between the pusher pin and clamping ear.
Figure 14:
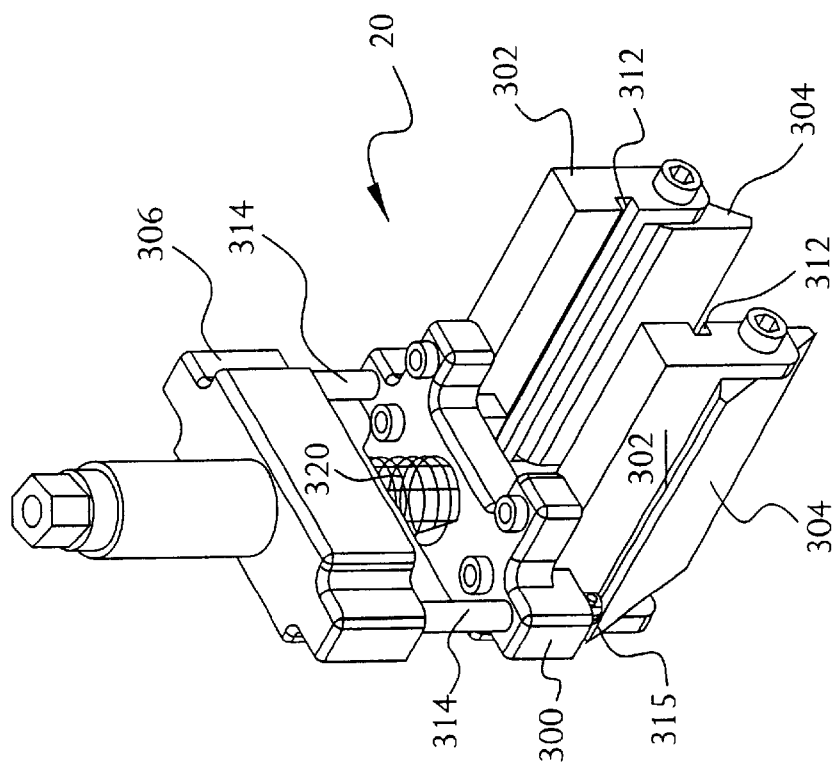
FIG. 14 is a perspective view of the clamping component of an electrofusion valve-clamping tool according to the present invention.
Figure 17A:
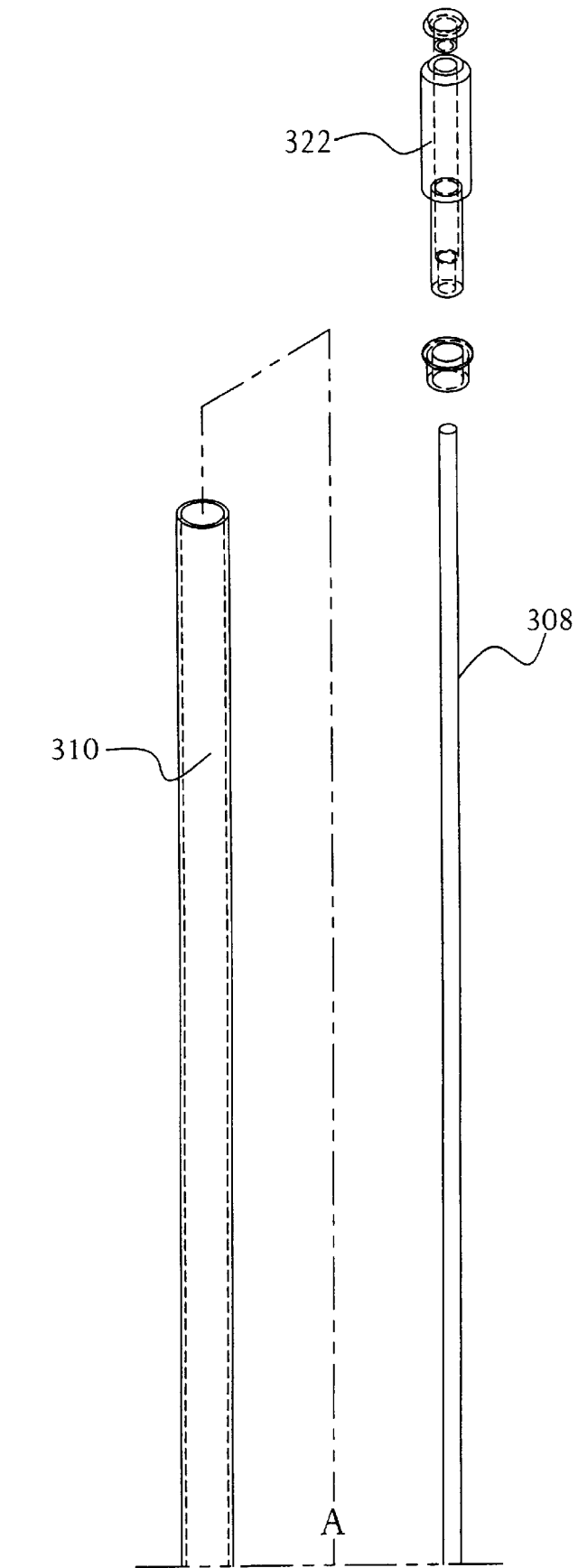
FIG. 17A is an exploded perspective view of the handle assembly of an electrofusion valve-clamping tool according to the present invention.
Figure 17B:
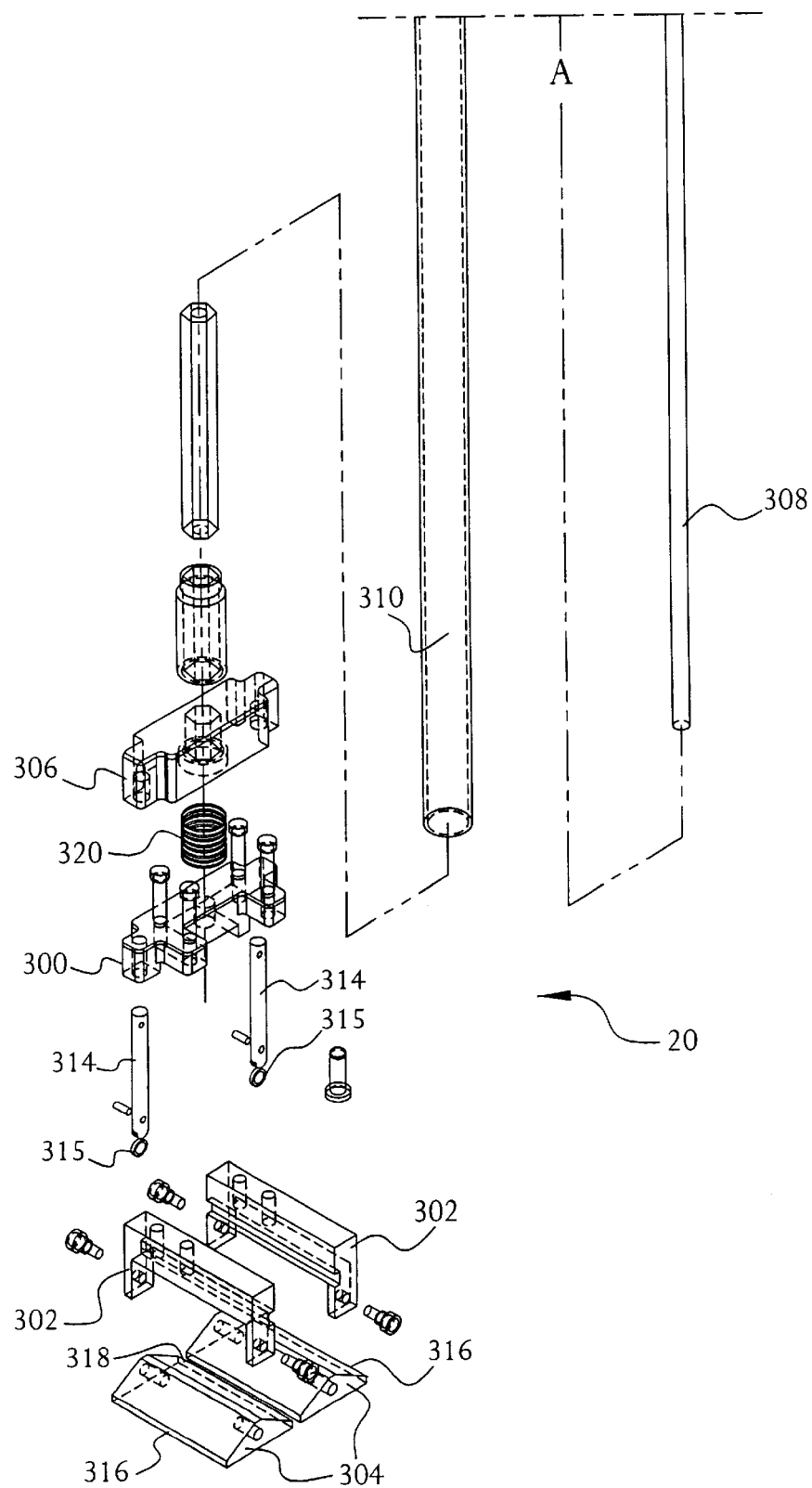
FIG. 17B is an exploded perspective view of the lower portion of an electrofusion valve-clamping tool according to the present invention.
Figure 22:
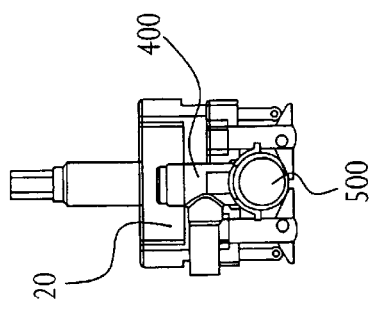
FIG. 22 is an end view of the clamping component of the electrofusion valve-clamping tool according to the present invention, showing the tool securing the adaptor to a pipe.

Referring to FIGS. 12A–12H and 13A–13M, the clamp arm 254 is actuated by the clamp actuating rollers 260A, 260B as they contact the pipe 500. As the pipe 500 is guided between the shoes 222 and the first 256 and second 258 guide plates, the clamp actuating roller 260A is pushed by the pipe 500 causing the clamp arm 254 to rotate. As the clamp arm 254 rotates, it traps the pipe 500 between the first 256 and second 258 guide plates and contacts the second clamp actuating roller 260B until the pipe 500 is secured and in contact with the depth gauge 262. Depth of cut is regulated by the depth gauge 262 which is held in position by the depth gauge knobs 264 (as best illustrated in FIG. 10A) Once the tool 10 is engaged with the pipe 500, it operatively rotates as best illustrated in FIGS. 13A–13M.

The second tool, the electrofusion valve-clamping tool 20, is illustrated in FIGS. 14–22. Referring to FIGS. 14–17B, the clamping tool 20 comprises a handle assembly 20A and a clamping component 20B. The clamping component 20B includes a main clamp body 300, a pair of substantially parallel valve retention arms 302 secured to the clamp body 300, a clamp paddle 304 pivotally secured to each valve retention arm 302, a pusher body 306, a handle 308 secured to the main body, and a pusher slide 310 surrounding the handle 308 and abutting the pusher body 306.

The main body 300 is dimensioned and configured to position the valve retention arms 302 so that a gas main pipe will fit between them. Each valve retention arm defines a slot 312, dimensioned and configured to mate with and secure one edge 402 of an adaptor 400. Each clamp paddle 304 is pivotally secured to its corresponding valve retention arm 302 by a pivot passing longitudinally through its central section.

The pusher body includes a pair of pusher pins 314 secured at either side. The opposite end of the pusher pins 314 each include a roller 315 abutting the outside edge 316 of one of the clamp paddles 304. Therefore, when the pusher body 306 moves downward towards the main body 300, the outer edges 316 of the paddles 304 are pushed downward, thereby raising the inner edges 318 of the paddles 304. Likewise, raising the pusher body 302 raises the outside edges 316 of the paddles 304, thereby lowering the paddle's inside edges 318. The pusher body 302 is biased away from the main body 300, preferably by a spring 320.

The handle assembly 20A of the electrofusion tool comprises a handle shaft 308 extends upward from the main body 300, terminating in handle 322. The clamping tool 20 includes means for pushing the pusher body 302 towards the main body 300, which is preferably in the form of a handle slide 310 surrounding the handle, abutting the pusher body 302. Pushing downward on the handle slide 310 thereby pushes downward on the pusher body 302.

Figure 21:
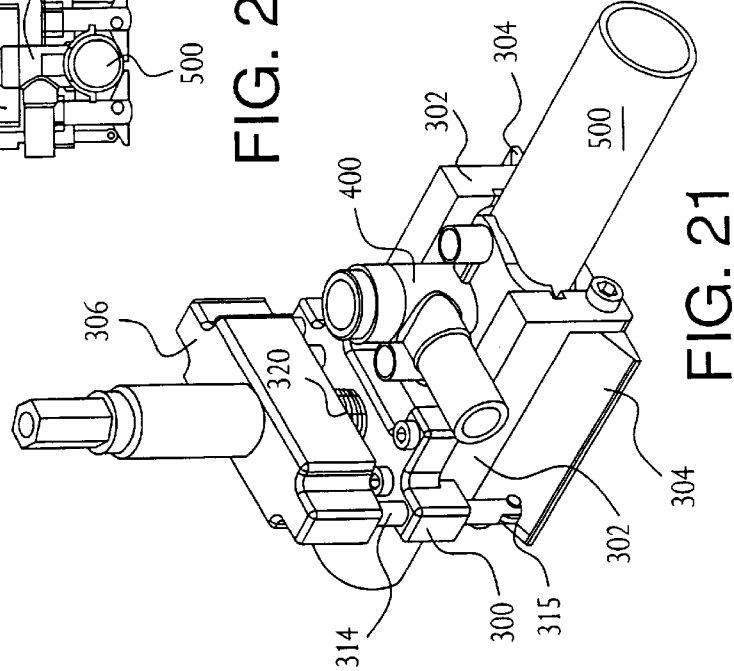
FIG. 21 is a perspective view of the clamping assembly of the electrofusion valve-clamping tool according to the present invention, showing the tool securing the adaptor to a pipe.
Figure 19:
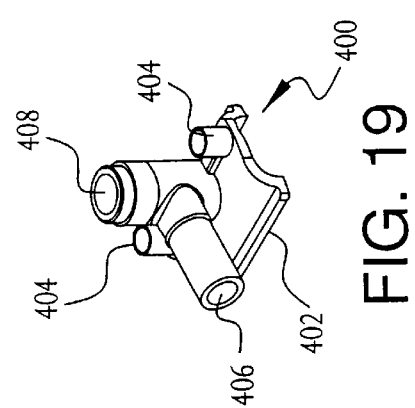
FIG. 19 is a perspective view of an adaptor that is standard in the art of connecting pipes, which the electrofusion valve-clamping tool is designed to clamp to a pipe.
Figure 20:
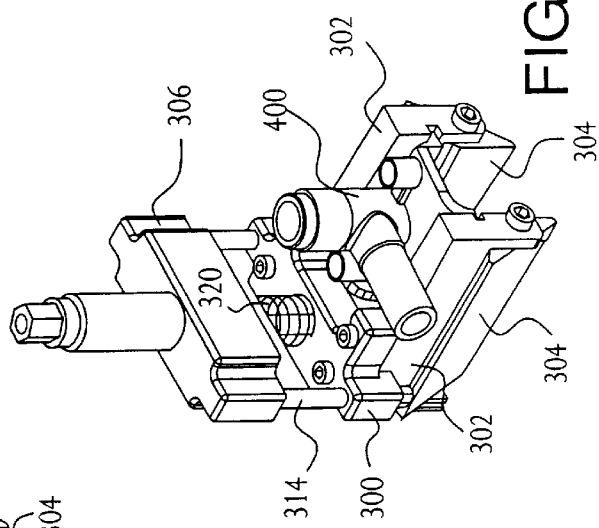
FIG. 20 is a perspective view of the clamping component of the electrofusion valve-clamping tool according to the present invention, showing the tool securing the adaptor.
Figure 18:
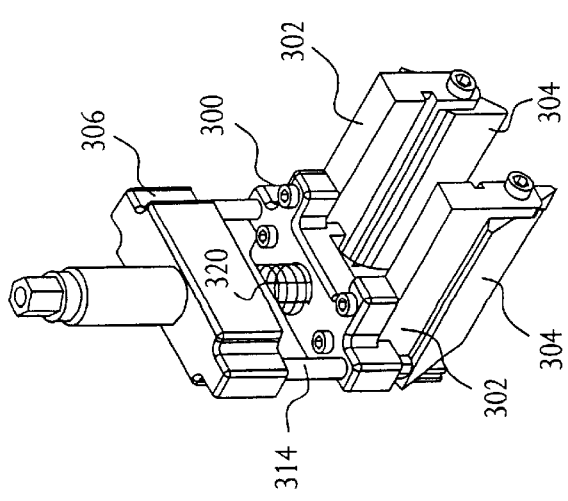
FIG. 18 is a perspective view of the clamping component of the electrofusion valve-clamping tool according to the present invention, showing the milling assembly prior to engaging the adaptor.
Figure 24A:
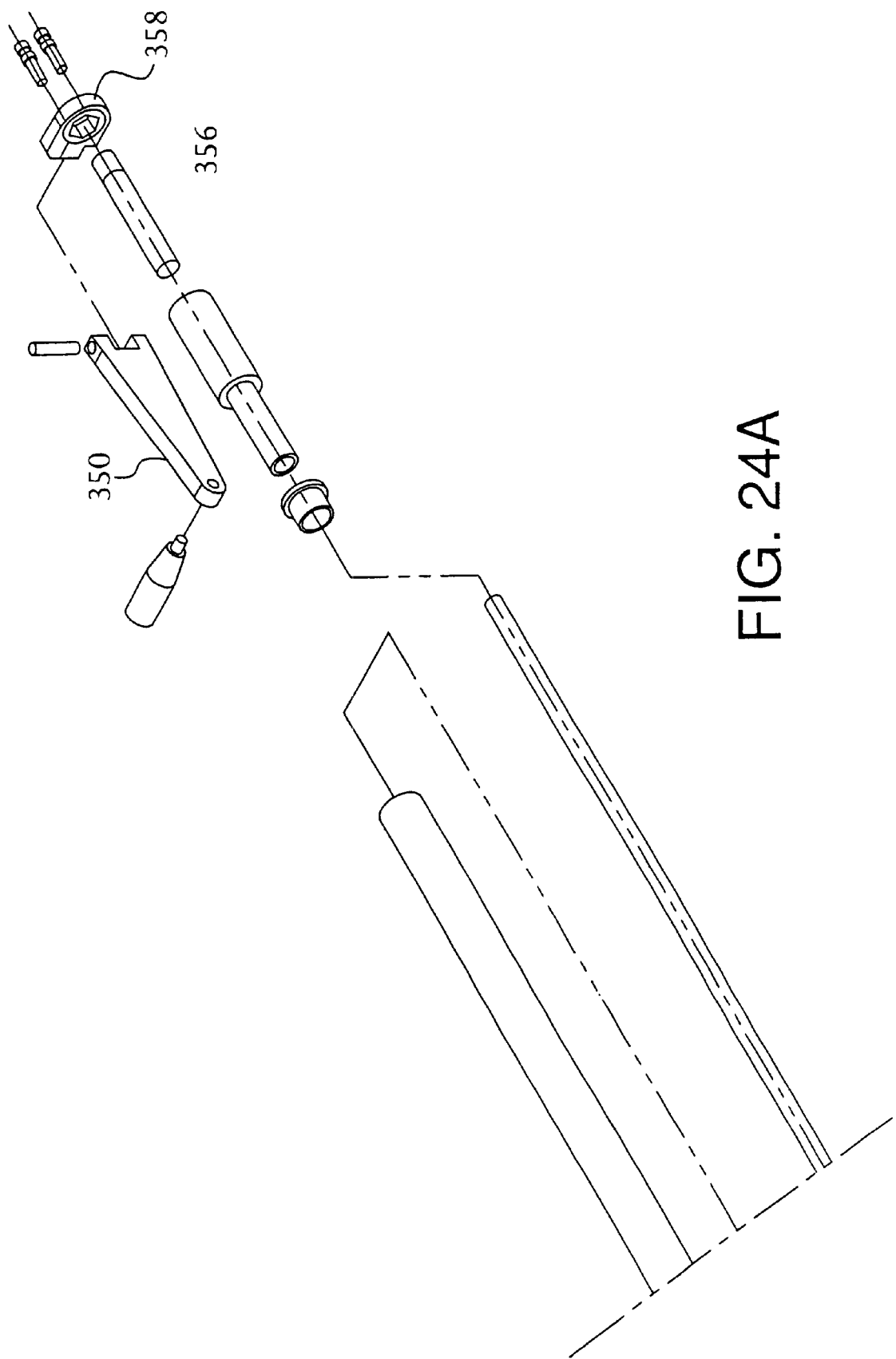
FIG. 24A is an exploded view of the handle portion of the clamping tool illustrating the alternate crank handle.
Figure 24B:
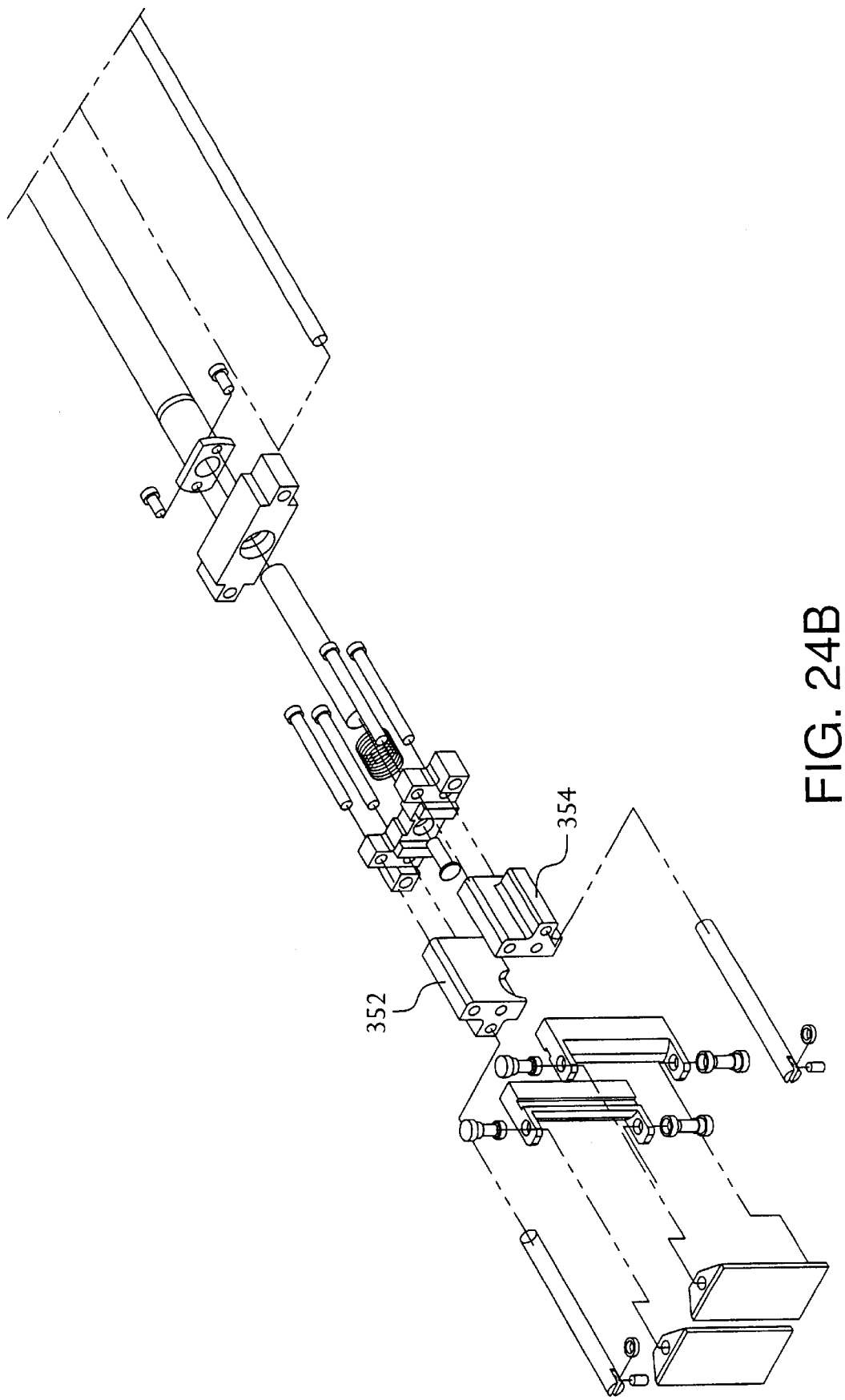
FIG. 24B is an exploded view of the clamp portion of the clamping tool illustrating the main body extensions and attachment to the handle portion.

FIGS. 18–22 illustrate the use of the clamping tool 20. The clamping tool 20 begins with the pusher 302 in its upper unclamped position, and the paddles 304 in their substantially vertical unclamped position. An adaptor 400 (FIG. 19) slides between the valve retention arms 302, and the edges 402 are contained within the slots 312, as illustrated in FIG. 21. The tool 20 is then lowered onto a gas main pipe 500, and the handle slide 310 is pushed downward. The pusher pins 314 are thereby pushed downward, pushing the paddles 304 into their substantially horizontal, clamped position, illustrated in FIGS. 21–22. The paddles pull the clamp 20 and adaptor 400 against the gas main pipe. Electrical current passing through electrodes 404 on the adaptor heat and soften the plastic, which in combination with the pressure supplied by the tool 20, secures the adaptor 400 to the pipe 500. The tool 20 is then moved horizontally rearward away from adaptor 400, and raised out of the hole.

Figure 25:
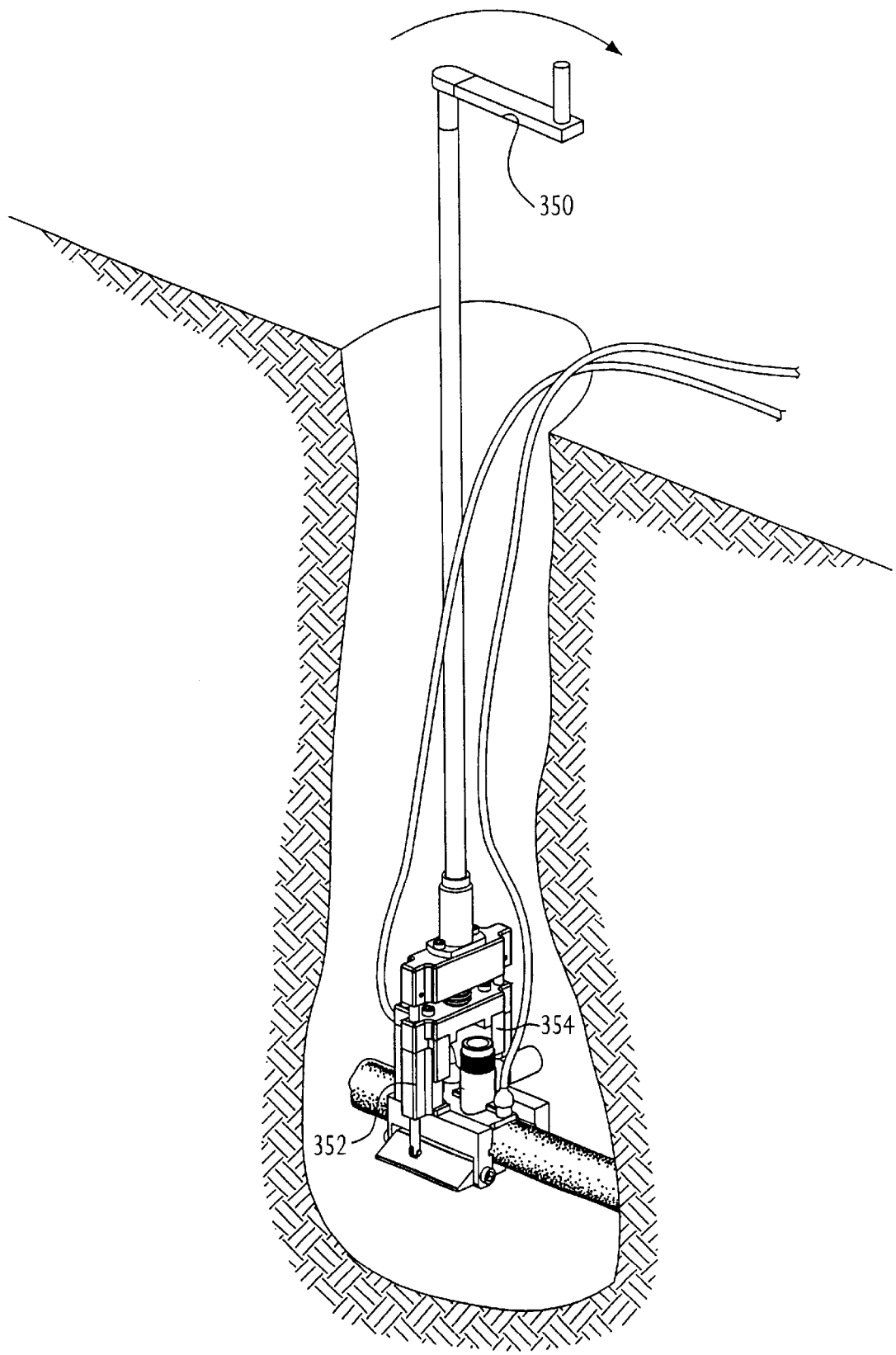
FIG. 25 is a perspective environmental view of the clamping tool illustrating the alternate handle and main body extensions attached to an exposed pipe and excavated access hole illustrating the rotation of the handle.
Figure 26C:
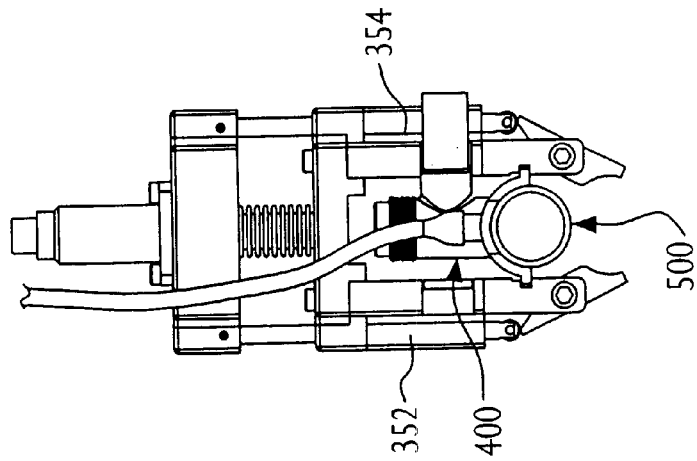
FIG. 26C is a front view of the clamp component of the clamping tool in the open position, illustrating the alternate main body extensions, having an attached valve with electrode connected engaged with a prepared pipe.
Figure 26B:
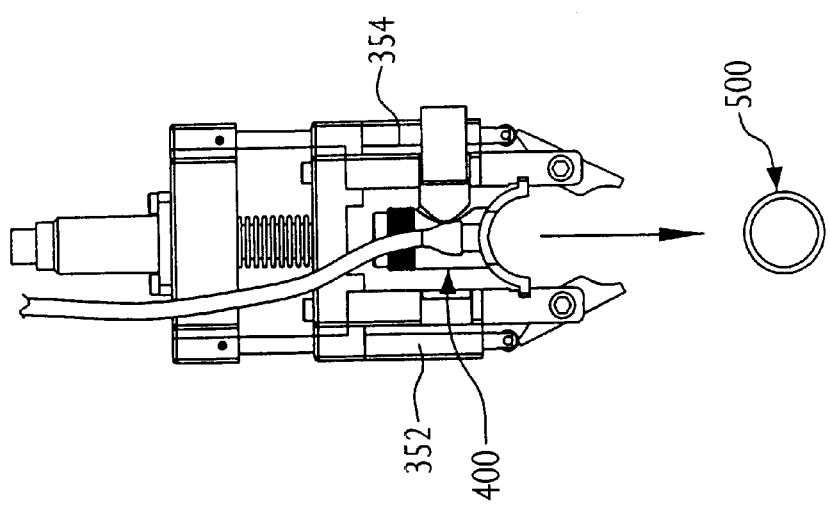
FIG. 26B is a front view of the clamp component of the clamping tool in the open position, illustrating the alternate main body extensions, having an attached valve with electrode connected being lowered onto a prepared pipe.
Figure 26A:
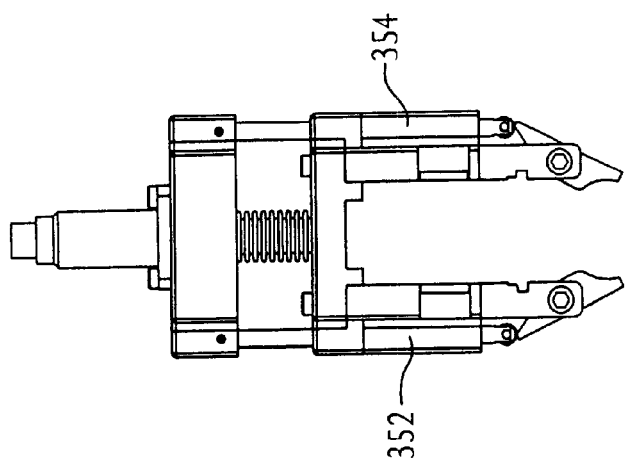
FIG. 26A is a front view of the clamp component of the clamping tool in the open position illustrating the alternate main body extensions.
Figure 26F:
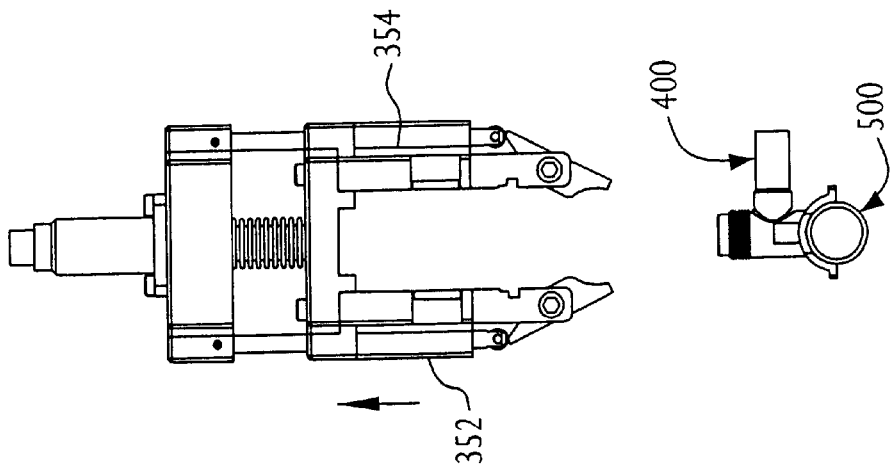
FIG. 26F is a front view of the clamp component of the clamping tool in the open position illustrating the alternate main body extensions being removed from a repaired pipe.
Figure 26E:
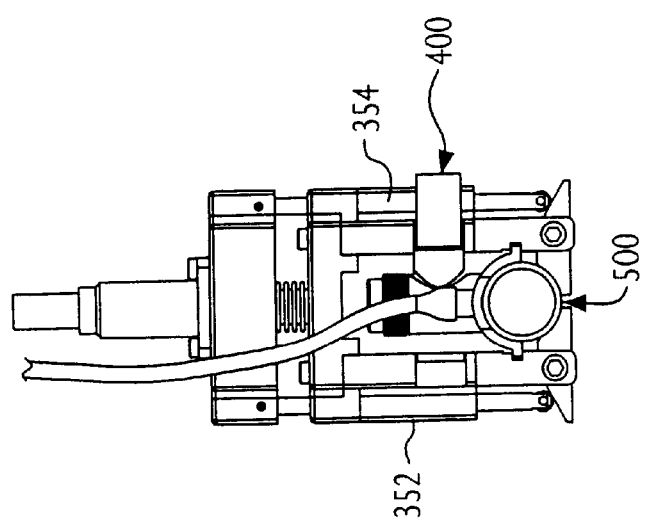
FIG. 26E is a front view of the clamp component of the clamping tool in the open position, illustrating the alternate main body extensions, having an attached valve with electrode connected engaged with a prepared pipe illustrating the paddles rotated and engaging the pipe.
Figure 26D:
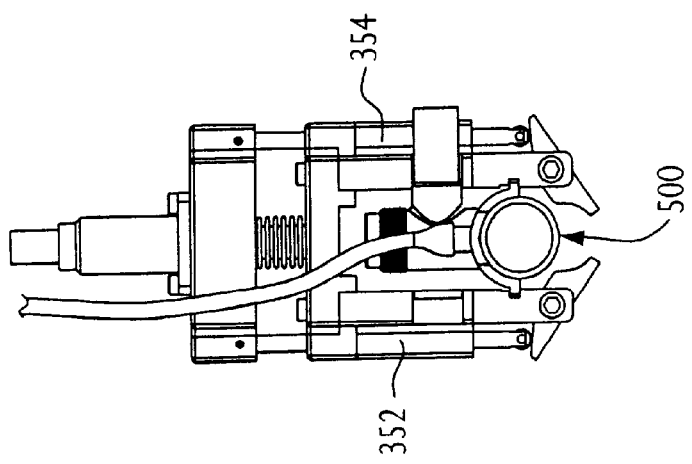
FIG. 26D is a front view of the clamp component of the clamping tool in the open position, illustrating the alternate main body extensions, having an attached valve with electrode connected engaged with a prepared pipe illustrating the rotational movement of the paddles.
Figure 27:
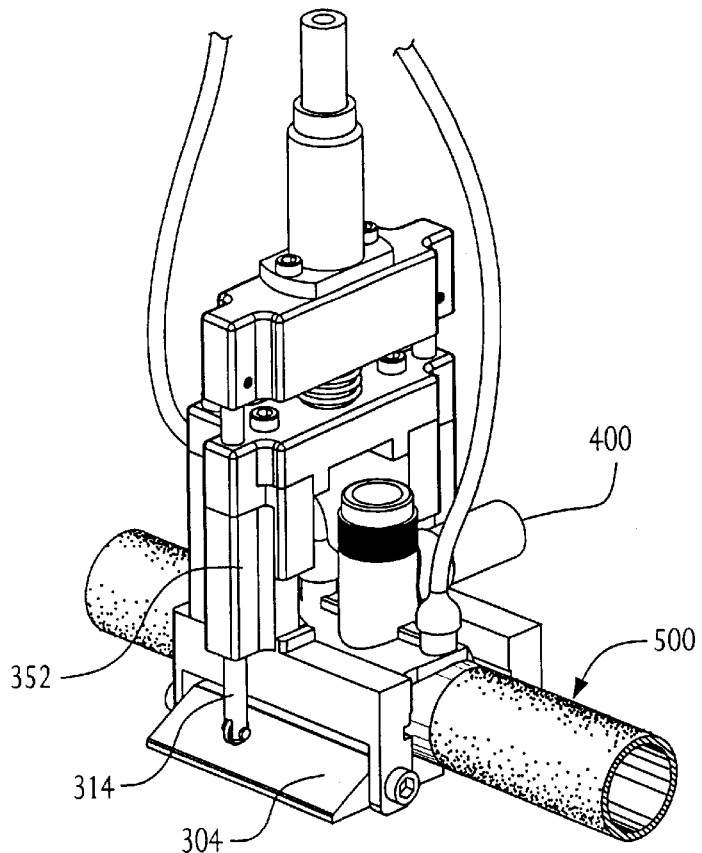
FIG. 27 is a perspective view of the clamp component of the clamping tool illustrating the alternate main body extensions having an attached valve with electrode connected engaged with a prepared pipe.
Figure 28:
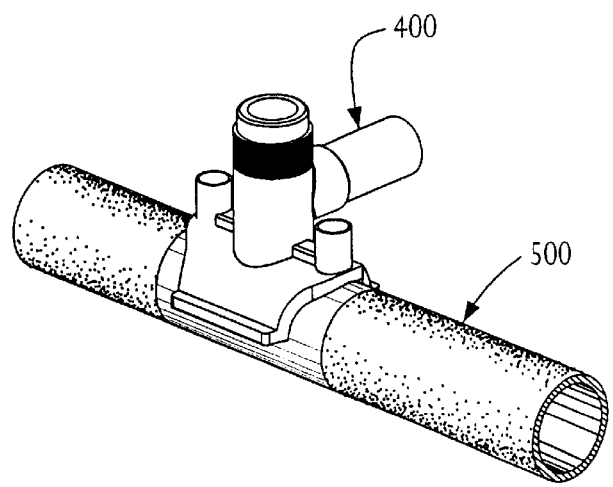
FIG. 28 is a perspective view of a repaired pipe illustrating the attached valve and prepared pipe area.

Referring to FIGS. 23–28, an alternate crank handle 350 and pusher body support right 352 and left 354 main body extension items are illustrated for the electrofusion tool 20. The alternate crank handle 350 rotates the ears of the paddles 304 into either a horizontal or vertical position. When the tool 20 is lowered onto the prepared pipe 500, the crank handle 350 is rotated in a clockwise direction (as best illustrated in FIGS. 25–26F). This action draws the main support 300, pusher body support right 352 and left 354 main body extension items, right and left paddles support 302 and right and left paddles 304 toward the pusher body 306. The pusher pins 314 exert a downward force on the paddles 304 thereby rotating the paddles 304 and trapping the pipe 500 between the paddles 304 and valve 400. The crank handle 350 is rotated until the clamp indicator 356 is flush with the top of the handle hinge 358. The handle hinge 358 is a preset indicator the signals the operator the proper force has been attained. As the tool is properly engaged with the pipe 500 (best illustrated in FIGS. 26E and 27), the electrofusion process is performed. Upon completion, the electrodes are removed and thereafter, the crank handle 350 is rotated counter clockwise until the paddles 304 are in the open position and the tool 20 is removed leaving the valve 400 attached to the pipe 500 (best illustrated in FIGS. 26F and 28).

It is to be understood that the invention is not limited to the preferred embodiments described herein, but encompasses all embodiments within the scope of the following claims.

We claim:

1. A pipe surface preparation device comprising:
    a handle including a long shaft portion and a gripping portion at one end of said shaft, the gripping portion having a clamp control connected thereto,
    a milling assembly mounted on the free end of the shaft portion including a pipe guide assembly, a clamp secured to said pipe guide assembly, a milling cutter connected thereto, and a motor and a gear box connected to operate said milling cutter; and
    a rotation control for causing the rotation of said milling assembly about the free end of the shaft portion, said rotation control being positioned proximate said gripping portion of said handle.

2. The pipe surface preparation device of claim 1,
    wherein said milling assembly includes a base plate having a front side and a back side, wherein said front side of said base plate includes a means for rotatably securing the milling cutter and a means for securing the gear box, wherein said back side of said base includes a means to secure the motor;
    wherein said motor operating said milling cutter is pneumatically driven;
    wherein said gripping portion of said handle also includes an pneumatic control valve mounted thereon, said pneumatic control valve being connected to said pneumatic motor and operated to control said motor; and
    wherein said clamp control is connected to operate said milling assembly clamp.

3. A pipe surface preparation device comprising:
    a handle member including a gripping portion and a long shaft extending therefrom, said handle member also having a clamp control proximate the gripping portion thereof;
    a milling assembly having a pipe guide assembly, a clamp secured to said pipe guide assembly, a milling cutter connected thereto, and a motor and pear box connected to operate said milling cutter; and
    a rotation control connected to said handle member for rotating said milling assembly about the end point of said handle and thereby about the exterior of said pipe;
    wherein said motor is a pneumatic motor;
    wherein said handle member also includes an pneumatic valve control for controlling the flow of gas to said pneumatic motor;
    wherein said milling assembly further includes a base plate having a front side and a back side, wherein said front side of said base plate includes means for rotatably securing the milling cutter and means for securing the gear box, wherein said back side of said base plate includes means to secure the motor;
    wherein said means for securing the milling cutter is a pair of flanges each having an aperture therethrough attached to said front side of said base plate, wherein a first flange of said pair of flanges is located substantially centrally on said front side of said base plate and a second flange of said pair of flanges is located at a first end of said front side of said base plate.

4. The pipe surface preparation device of claim 3, wherein said means for securing the gear box is a flange located at a second end of said front side of said base plate having an aperture therethrough and said substantially centrally located first flange of said pair of flanges.

5. The pipe surface preparation device of claim 3, wherein said milling cutter is surrounded on three sides by a cutter shield attached to said side plates.

6. The pipe surface preparation device of claim 3, wherein said means for securing a motor comprises a mounting means attached to said back side of said base plate, wherein said base plate has an aperture there through for connection of said motor with said gear box.

7. The pipe surface preparation device of claim 3, wherein said pipe guide assembly comprises a pair of plates, one attached at each end of said front side of said base plate.

8. The pipe surface preparation device of claim 7, wherein said pipe guide assembly further comprises a first and second side plate each extending from said pair of end plates.

9. The pipe surface preparation device of claim 8, wherein said first side plate includes a means for pivotably securing a clamp.

10. The pipe surface preparation device of claim 9, wherein said clamp on said first side plate is pivotable.

11. The pipe surface preparation device of claim 3, wherein said handle is pivotably attached to said milling assembly at the end of said shaft opposite said handle portion.

12. The pipe surface preparation device of claim 11, wherein said clamp control comprises a clamp lever attached to a first end of a push-pull cable, wherein a second end of said push pull cable is attached to said clamp of said milling assembly.

13. The pipe surface preparation device of claim 11, wherein said rotational control comprises a lever secured to a pulley engaging a continuous loop cable, wherein said continuous loop cable is further engaged with a second pulley attached to said milling assembly, wherein pulling said lever in either direction corresponds to said milling assembly rotating to a position substantially 90 degrees from center.

14. The pipe surface preparation device of claim 11, wherein said air valve control is connected to said motor by a conduit.

15. A method for connecting underground pipe while minimizing disturbance of the surrounding landscape comprising the steps of:
   excavating the area above the damaged pipe;
   milling the oxide from the pipe with a surface preparation means;
   attaching an adapter to a fusing means;
   fusing the adapter to the oxide milled area of the pipe; and
   filling the excavated area above the pipe.

16. The method of claim 15, wherein said surface preparation means includes a milling assembly having a pipe guide assembly, a clamp secured to one side of said pipe guide assembly, a milling cutter attached thereto, a motor with a gear box connected to drive the milling cutter; and a connected handle including a shaft having a clamp control, a rotation control for controlling the rotation of said milling assembly and an air control valve.

17. The method of claim 15, wherein said fusing means comprises a clamp body, a pair of substantially parallel valve retention arms extending substantially perpendicular to said clamp body, a pair of pivotable clamp paddles each attached to said valve retention arms, a pusher body, a handle having a first end and a second end, wherein said second end is secured to said clamp body; and a pusher slide surrounding said handle and abutting said pusher body.

18. A pipe surface preparation device comprising:
   a manually operated handle having an elongated shaft with a gripping portion at one end; and
   a milling assembly connected to the opposite end of said elongate shaft and being rotatably movable about the said opposite end;
   wherein said milling assembly includes a pipe guide assembly, a clamp secured to said pipe guide assembly and a means for milling a pipe.

19. The pipe surface preparation device of claim 18, wherein said milling assembly comprises a base plate having a front side and a back side, wherein said front side of said base plate includes a means for rotatably securing the milling cutter and a means for securing the gear box, and
   wherein said back side of said base includes a means to secure the motor.

20. A surface preparation device comprising:
   a handle having an elongated shaft; and
   a milling assembly comprised of a pipe guide assembly, a clamp secured to said pipe guide assembly and a means for milling a pipe;
   wherein said milling assembly comprises a base plate having a front side and a back side, wherein said front side of said base plate includes a means for rotatably securing the milling cutter and a means for securing the gear box, wherein said back side of said base includes a means to secure the motor;
   wherein said means for securing a milling cutter is a pair of flanges each having an aperture therethrough attached to said front side of said base plate;
   wherein a first flange of said pair of flanges is located substantially centrally on said front side of said base plate and a second flange of said pair of flanges is located at a first end of said front side of said base plate.

21. The surface preparation device of claim 20, wherein said means for securing the gear box is a flange located at a second end of said front side of said base plate having an aperture therethrough and said substantially centrally located first flange of said pair of flanges.

22. The surface preparation device of claim 20, wherein said means for securing a motor comprises a mounting means attached to said back side of said base plate, wherein said base plate has an aperture there through for connection of said motor with said gear box.

23. The surface preparation device of claim 20, wherein said pipe guide assembly comprises a pair of U-shaped plates, one attached at each end of said front side of said base plate.

24. The surface preparation device of claim 23, wherein said pipe guide assembly further comprises a first and second side plate each extending from said pair of end plates.

25. The surface preparation device of claim 24, wherein said first side plate includes a means for pivotably securing a clamp.

26. The surface preparation device of claim 25, wherein said clamp on said first side plate is pivotable.

27. The surface preparation device of claim 20, wherein said milling assembly includes a means for regulating the depth of milling of a pipe.

28. The surface preparation device of claim 27, wherein said means for regulation the depth of the milling of a pipe is a circular guide attached to said U-shaped plates.

29. The surface preparation device of claim 20, wherein said handle further comprises a means for controlling the amount of compressed air to said milling assembly.

* * * * *